United States Patent [19]

Baker

[11] 3,748,492

[45] July 24, 1973

[54] LIGHT-TRIGGERED ELECTRIC POWER SOURCE

[75] Inventor: Richard H. Baker, Bedford, Mass.

[73] Assignee: Massachusetts Institute of Technology, Cambridge, Mass.

[22] Filed: May 25, 1972

[21] Appl. No.: 256,811

[52] U.S. Cl. .................... 307/117, 307/279, 323/21

[51] Int. Cl. .................... H01h 35/00

[58] Field of Search .................... 307/112, 113, 115, 307/116, 117, 109, 110, 279; 321/15; 323/21

[56] References Cited

UNITED STATES PATENTS

| | | | |
|---|---|---|---|
| 2,056,376 | 10/1936 | Travis | 321/15 |
| 2,956,183 | 10/1960 | Culbertson | 307/109 |
| 3,002,114 | 9/1961 | Englund | 307/110 |
| 3,263,099 | 7/1966 | Bedford | 307/109 |
| 3,377,541 | 4/1968 | Farkas | 321/15 |
| 3,432,738 | 4/1969 | Jensen | 321/15 |
| 3,619,665 | 11/1971 | Kosonocky | 307/279 |
| 3,631,259 | 12/1971 | Kiota | 307/110 |
| 3,646,439 | 2/1972 | Broski | 323/21 |

*Primary Examiner*—Herman J. Hohauser
*Assistant Examiner*—M. Ginsburg
*Attorney*—Arthur A. Smith, Jr., Robert Shaw et al.

[57] ABSTRACT

An electric power source for delivering a controllable voltage to a load. It has low power loss and is capable of acting as a programmable source of electric energy, one which can be used, for example, to furnish a very high-voltage output from a light-weight system. The power source is a modular type structure in which the apparatus is made up of a number of identical stages or modules connected in cascade. Each stage includes a voltage supply and floating reference voltage means connected to the supply. The voltage supply is connected to the output of the source through bilateral, solid-state switches along alternate electrically conductive paths which connect either one side or the other of the voltage supply to the output. A bistable circuit serves to control the bilateral switches, triggering of the bistable circuit being effected by radiation impinged upon light sensitive devices, the devices being connected to perform a set-reset type function of the circuit. The floating reference voltage provides a constant electric potential for switching purposes. The system can be used to step up a voltage, and a form thereof can be used to step a voltage down.

54 Claims, 20 Drawing Figures

LIGHT-TRIGGERED ELECTRIC POWER SOURCE

The invention described herein was made in performance of work under a NASA contract and is subject to the provisions of Section 305 of the National Aeronautics and Space Act of 1958, Public Law 85-568 (72 Stat. 435; 42 U.S.C. 2457).

The present invention relates to electric power supplies and, in particular, to electric power supplies employing light as an actuator to effect switching of bilateral switches therein, thereby to control the output.

A good high voltage power supply design should be compact and light weight. The electronics must be packaged such that potential gradients are minimized, that is, controlled in order to avoid corona and other breakdown phenomena. The power conversion efficiency should be high, which means low parisitics and leakage power losses, in order to minimize internal dissipation. Further, the design should be adaptable to satisfy a wide range of output voltages and power requirements.

Accordingly, it is a primary object of the present invention to provide a novel light-weight, versatile, and efficient electric power supply.

A further object is to provide a power supply that is susceptible of close control employing program techniques.

Another object is to provide a power supply capable of furnishing a very high voltage output, as a series of smaller voltages, a voltage supply which is adapted to permit isolation between active elements thereof by use of light as the actuator to perform vital circuit functions in the circuit making up the supply.

A still further object is to provide a power supply having solid-state switching devices as active circuit elements and one which can be fabricated employing integrated-circuit techniques.

Still another object is to provide a power supply which can step a voltage up or step a voltage down, or both.

The foregoing and still further objects are discussed hereinafter and are particularly pointed out in the appended claims.

In summary, the objects of the invention are attained in an electric system that includes supply voltage means (or energy storage means) connected along alternate electric paths to an electric terminal connection thereof. Bilateral solid-state switches, electrically connected in said paths, are operable to connect either one side or the other of the supply voltage means to said terminal as alternate states of system operation. Reference voltage means is connected to the supply voltage means and is adapted to derive a center-referenced control voltage therefrom. A floating bistable circuit acts to control the switches, the bistable circuit being triggered by light-sensitive means to effect switching from one to the other of said states. The reference voltage means acts as a source of constant voltage referenced to the supply voltage to control switching. The foregoing describes one stage of what is usually a multiple-stage system. The system can be used to step a voltage up, and/or to step a voltage down, and/or to control closely the magnitude of a voltage delivered to a load. A simplified system is disclosed for situations in which down conversion alone is required, and another for circuits in which field effect devices perform the bilateral switch functions.

The invention will now be explained with reference to the accompanying drawing in which.

Figure 1:
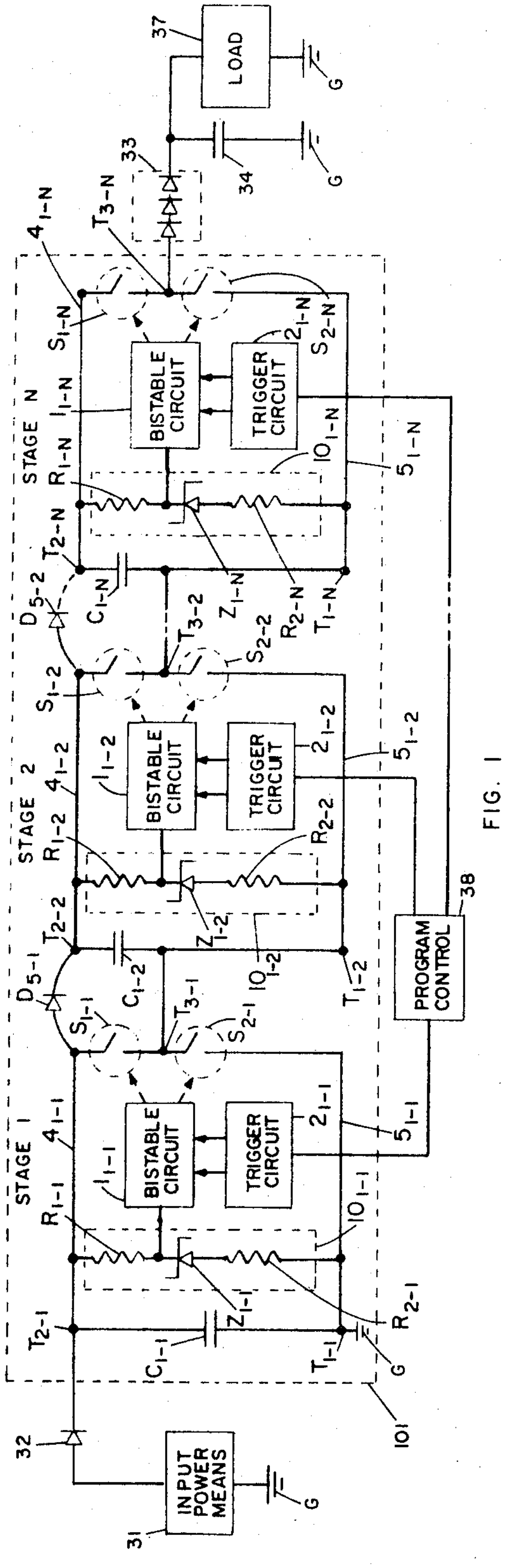
FIG. 1 is a schematic circuit diagram, partially in block diagram form, showing a light-triggered electric system operable to step a voltage input up to some higher magnitude at the output, the system shown having a plurality of stages, each stage having a supply voltage means which is a capacitor in FIG. 1.

Turning now to FIG. 1 a low power-loss, light-triggered electric power source or system (also termed herein PSC to denote "parallel-series-chain") is shown at 101 and includes the elements thereshown between an input power means 31 and the system output terminal designated $T_{3-N}$. The PSC 101 comprises a plurality of stages labeled stage 1, stage 2 . . . stage N connected in cascade. Each stage contains supply voltage means $C_{1-1}$, $C_{1-2}$ . . . $C_{1-N}$ in FIG. 1, and floating reference supply voltage means, $10_{1-1}$, $10_{1-2}$ . . . $10_{1-N}$, comprising zener diodes $Z_{1-1}$, $Z_{1-2}$ . . . $Z_{1-N}$, respectively, connected between resistances $R_{1-1}$–$R_{2-1}$, $R_{1-2}$–$R_{2-2}$ . . . $R_{1-N}$–$R_{2-N}$, respectively, to provide (in combination with other circuit elements later discussed) a center-referenced, reference voltage derived from the associated supply voltage means. The voltage supply means $C_{1-1}$, $C_{1-2}$ . . . $C_{1-N}$ in each of the various stages, for the reasons hereinafter given, is connected along bilateral (i.e. bidirectional) alternate conductive paths $4_{1-1}$–$5_{1-1}$, $4_{1-2}$–$5_{1-2}$ . . . $4_{1-N}$–$5_{1-N}$, respectively, to the outputs designated $T_{3-1}$, $T_{3-2}$ . . . $T_{3-N}$, respectively, from the individual stages, the latter being the output of the PSC 101, as above mentioned. The bilateral nature of the paths in the system of FIG. 1 is quite important, a fact that will become evident in the detailed explanation that follows; suffice to say at this juncture that the required characteristic is provided by bilateral (i.e., bidirectional) switches $S_{1-1}$ and $S_{2-1}$, $S_{1-2}$ and $S_{2-2}$ . . . $S_{1-N}$ and $S_{2-N}$ for the various stages shown and that the switches, in order to give the small size, speed of operation, light-weight, etc., contemplated in the present apparatus, are solid-state devices. A most important aspect of the present invention is the idea of switching the bilateral switches $S_{1-1}$ and $S_{2-1}$ etc., in response to light signals in order, among other things, to avoid using high voltage coupling capacitors which have high power losses and are large and heavy in the context of the present system. Also, the system herein described contemplates, in many situations, several hundred or several thousand stages adapted to be interconnected in a programmable fashion to furnish a desired voltage output, and switching in response to light renders the system quite versatile.

Figure 2:
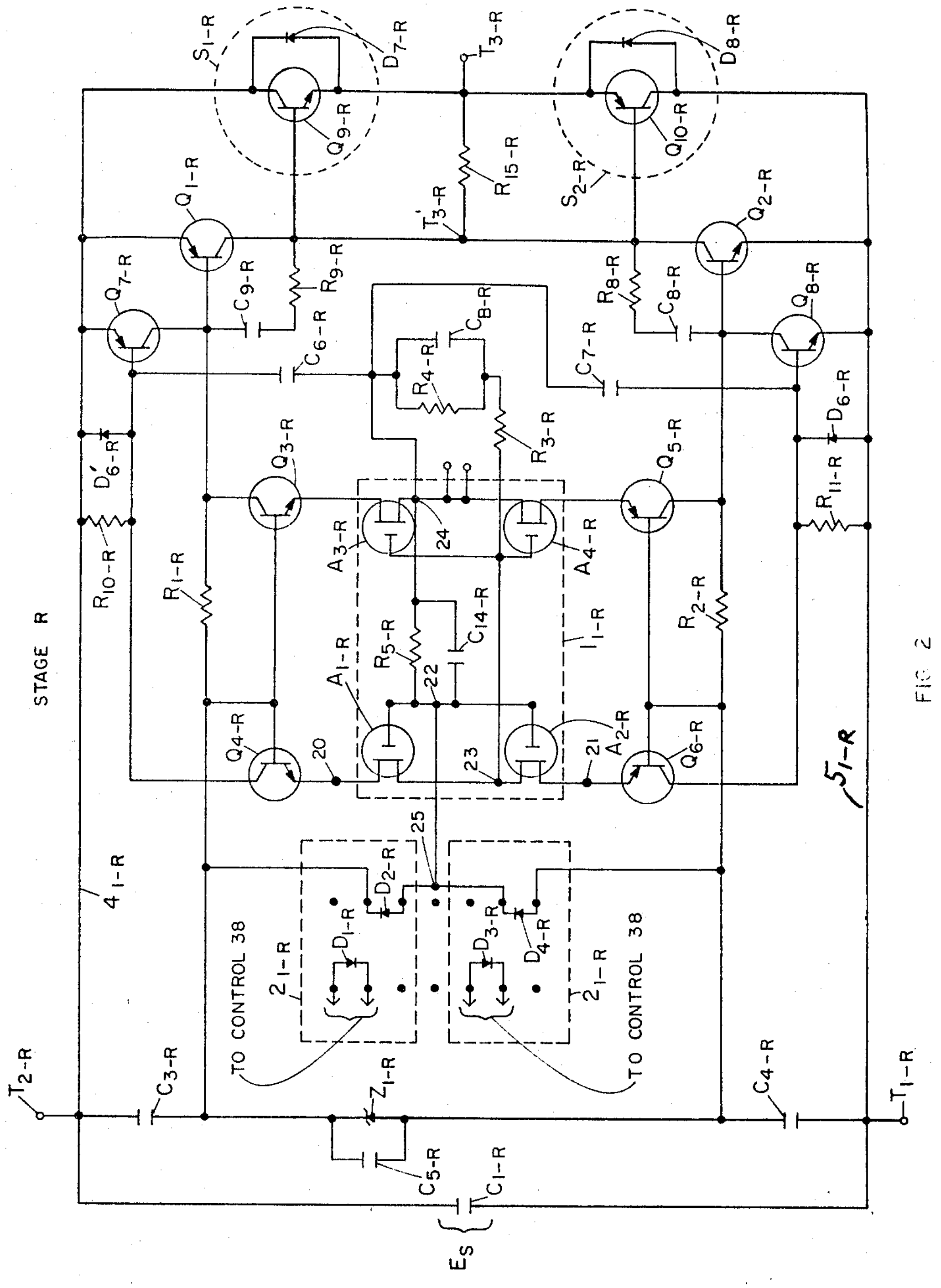
FIG. 2 is a schematic and detailed diagram of one stage of the apparatus of FIG. 1.

Control of the switches $S_{1-1}$ and $S_{2-1}$, . . . $S_{1-N}$ and $S_{2-N}$ is indicated to be by the associated bistable circuits $\mathbf{1}_{1-1}$ . . . $\mathbf{1}_{1-N}$ which are set and reset by associated trigger circuits $\mathbf{2}_{1-1}$, $\mathbf{2}_{1-2}$ . . . $\mathbf{2}_{1-N}$, respectively; the latter, as shown in FIG. 2, which shows the Rth stage, comprises light sensitive diodes $D_{2-R}$ and $D_{4-R}$, respectively. (It should be noted here that the function of the light-emitting diodes later mentioned can be performed by some outside source of light as hereinafter indicated and that the function of the light sensitive diodes $D_{2-R}$ and $D_{4-R}$ can be performed by other light sensitive devices such as, for example, light-sensitive transistors and the like.) A detailed explanation of the way the individual stages work is later made with reference to FIGS. 2 and 3A–3E, but first there follows a discussion of overall operation with reference to FIG. 1.

In FIG. 1, the power source or PSC 101 derives its energy from the input power means 31 through a rectifier 32 connected to the system between input terminals $T_{1-1}$ and $T_{2-1}$, the former of which is shown to be grounded at G. (Ground is intended to designate a common connection. Further, it will be noted that only stage 1 is thus grounded; also, the input to the system is to stage 1, the output terminals $T_{3-1}$, $T_{3-2}$ . . . , except the last, being connected as an input to the next succeeding stage and being connected to either to $T_1$ or the $T_2$ terminal of that stage, i.e., $T_{3-1}$ can be connected either to $T_{1-2}$, as shown, or to $T_{2-2}$, but other circuit changes may be necessary.) The power source 101 delivers power from its input $T_{1-1}$ and $T_{2-1}$ to its output $T_{3-N}$ where it is connected through rectifier means 33 to a load 37, a storage capacitance 34 being employed (in d-c systems) to maintain the level of the voltage to the load during the switching, now discussed. To step up the voltage to the load 37 the capacitors $C_{1-1}$, $C_{1-2}$ . . . $C_{1-N}$ are charged by being connected in parallel across the source input $T_{1-1}$-$T_{2-1}$ and are discharged in series. Parallel connection is accomplished by closing the switches $S_{2-1}$, $S_{2-2}$ . . . $S_{2-N}$ ($S_{1-1}$,$S_{1-2}$ . . . $S_{1-N}$ are open). Since, as shown, only stage 1 is grounded, current will pass from the terminal $T_{2-1}$ to ground G through the capacitor $C_{1-1}$, through the diode labeled $D_{5-1}$ to the capacitor $C_{1-2}$ and the switch $S_{2-1}$ to ground, and through the diode labeled $D_{5-2}$ to the next subsequent stages and finally through the capacitor $C_{1-N}$ and the switches $S_{2-(N-1)}$ . . . $S_{2-2}$ and $S_{2-1}$ to ground. In this, the charging condition (or state) of the source 101, the switch $S_{2-N}$ is also closed; however, the rectifier means 33 prevents current from flowing backward in the circuit. In the discharge condition (or high-voltage state), all the switches $S_{1-1}$,$S_{1-2}$ . . . $S_{1-N}$ are closed and the switches $S_{2-1}$,$S_{2-2}$ . . . $S_{2-N}$ are open. The circuit in this situation can be traced from the ground terminal $T_{1-1}$ through the capacitor $C_{1-1}$ to the terminal $T_{2-1}$, through the switch $S_{1-1}$ and the capacitor $C_{1-2}$ to the switch $S_{1-2}$ and thence, finally, through the capacitor $C_{1-N}$ to the switch $S_{1-N}$ and the load 37. The voltage delivered at the load 37 is the sum of the voltages across the capacitors $C_{1-1}$,$C_{1-2}$ . . . $C_{1-N}$. It will be appreciated that the voltage which would be delivered the load if the switch $S_{2-1}$ were closed and the switch $S_{1-1}$ open, in the latter state of system operation, would be the sum of the voltages $C_{1-2}$ . . . $C_{1-N}$. Thus, for example, if the number of stages used in the chain of stages shown in FIG. 1 is one thousand and each is charged to some voltage $V_1$ in the charging state, the voltage delivered to the load can be modified up or down in increments $V_1$ depending on the number of stages connected in series in the discharge (or other) state of operation. Furthermore, it will be appreciated that a plurality of chains, like the chain shown, can be employed, and, with appropriate interconnection and programming, any desired voltage and electric current conditions at the load 37 can be obtained. Appropriate program control can be furnished by the element numbered 38; the control unit 38 can include digital computers or analog circuitry, or both, depending on requirements for a particular system. The above-described system revolves around a d-c voltage output and holds true for most of the discussion herein; but it is later shown that the system can also function as an a-c source (single or polyphase). In either situation, the voltage at the system output terminal $T_{3-N}$ can be a square wave or it can have some other configuration including that of a multi-step function, the latter of which, as later discussed, provides a high efficiency system.

The salient features of a parallel-series connected chain such as the PSC 101 are several. First, the capacitors $C_{1-1}$, $C_{1-2}$ . . . $C_{1-N}$ are replenished in parallel at low voltage. Second, the system output voltage ($V_o$) and power ($P_O$) are equal to the sum of the voltage per stage and power per stage, respectively. That is, $$V_O = NV_S \tag{1}$$

$$P_O = NP_S, \tag{2}$$

where N is the number of stages, $V_S$ is the voltage per stage, and $P_S$ is the power handled (transferred to the output per stage). Third, the total overall power transfer efficiency of a parallel-series chain is equal to the average efficiency of all the stages, that is:

$$n_{total} = {}^{n}1 + {}^{n}2 + \ldots {}^{n}R \ldots {}^{n}N/N = \bar{n}_S \,. \tag{3}$$

where $n_R$ is the efficiency of the Rth stage, $$n_R = {}^PO \text{ (high voltage) R/Power In (low voltage)R} \quad (4)$$

and from equation (3) and (4) it follows that $$n_{total} = {}^PO \text{ (high voltage) average/Power In (low voltage)} . \quad (5)$$

The applicability and limitations of the concepts expressed in equations (1)-(5) will be discussed in detail later; however, taken literally for the moment, the results means that, in principle, a parallel-series connected chain of individual modules can be used to produce any voltage at any power level with an average efficiency equal to that of a single stage. A fourth important feature of the above-discussed power source is that, if the individual stages are triggered independently, then one set of N identical stages can be used to attain a time-variable output voltage by swtching an ordered set of the stages. That is, with independently controlled stages, a parallel-series connected chain is a programmable supply, as above discussed.

The basic conceptual design and functional characteristics described above are now discussed in detail with reference to the circuit diagrams in FIGS. 2 and 3A–3E. The stage R shown in FIG. 2 (and FIGS. 3A–3E) is a three-terminal 5-port network. The energy storage element shown at $C_{1-R}$ is connected between two input terminals $T_{1-R}$ and $T_{2-R}$ and the output terminal $T_{3-R}$, one side or the other of the element $C_{1-R}$ being connected to the output terminal $T_{3-R}$ depending upon which of switches $S_{1-R}$ and $S_{2-R}$ is closed. The switch position is controlled by buffer amplifiers driven by the bistable circuit labeled $\mathbf{1}_{1-R}$. The entire network including the bistable circuit is a low power design and floats without reference to system ground. It is a relatively sophisticated network with many interrelated functional parts and can be best explained by breaking it into a series of basic circuit parts; and that is done in the following few paragraphs. Equivalents to many of the circuit elements shown in FIGS. 2 and 3A–3E have been discussed above since, as should be apparent, stage R is merely a typical stage of stages 1, 2 . . . N of FIG. 1; thus, for example, the zener diode $Z_{1-1}$, performs the identical function of the zener diode designated $Z_{1-R}$. In what follows, therefore, those elements which have been mentioned will be taken up on the basis that their function is understood. The circuit element labeled $M_R$ in FIG. 3D is a light-triggered memory circuit which includes the bistable circuit shown at $\mathbf{1}_{1-R}$ in FIG. 2 and the trigger circuit labeled $\mathbf{2}_{1-R}$.

Figure 3A:
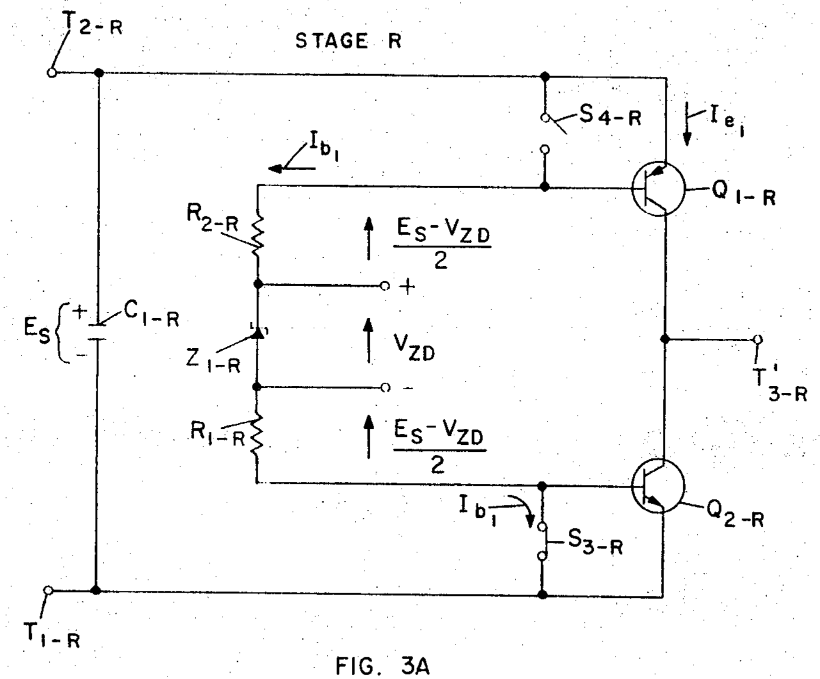
FIGS. 3A–3E are circuit diagrams showing details of various portions of the circuitry of FIG. 2 in order to facilitate the explanation of the invention.

In FIG. 3A, it is assumed that a source of potential is connected across terminals $T_{1-R}$ and $T_{2-R}$ ($T_{2-R}$ positive with respect to $T_{1-R}$) and that the switch shown at $S_{3-R}$ is closed while the switch shown at $S_{4-R}$ is open. (As later explained the switches $S_{3-R}$ and $S_{4-R}$ are shown as conventional mechanical switches in FIGS. 3A,3B and 3E but in the form of transistor devices in FIG. 3C.) In this circumstance, a transistor $Q_{1-R}$ will conduct current and a transistor $Q_{2-R}$ will not. In the absence of a load connected to the terminal $T'_{3-R}$, the transistor $Q_{1-R}$ will be "saturated" with its emitter current $I_{e_1}$ and base current $I_{b_1}$ almost equal (except for leakage current through the collector junction of the transistor $Q_{2-R}$).

Then, $$I_{e_1} \approx I_{b_1} = E_s - V_{ZD}/R_1 + R_2 , \quad (6)$$

where $V_{ZD}$ is the zener diode $Z_{1-R}$ breakdown voltage (say, 7 volts) and is referenced to $E_s$, the voltage across the capacitor $C_{1-R}$, by the ratio of resistances $R_1$ to $R_2$; that is, $$I_{b_1}R_1 + V_{ZD}/2 + V_{ZD}/2 + I_{b_1}R_2 = E_s . \quad (7)$$

If the resistances $R_1$ and $R_2$ are of equal value, then:

$$I_{b_1}R_1 = I_{b_2}R_2 = E_s - V_{ZD}/2 . \quad (8)$$

In the foregoing expressions $I_{e_1}$ is the emitter current of the transistor $Q_{1-R}$; $I_{b_1}$ is the base current of the transistor $Q_{1-R}$; $E_s$ is the voltage across the storage capacitor $C_{1-R}$; and $R_1$ and $R_2$ are the resistance values of resistors $R_{1-R}$ and $R_{2-R}$, respectively.

If the switch $S_{4-R}$ is closed and the switch $S_{3-R}$ is open, the roles of the transistors $Q_{1-R}$ and $Q_{2-R}$ interchange, but the results of equation (6)–(8) are the same and the current through the zener diode $Z_{1-R}$ is unaltered. Consequently, the voltage across the zener diode is constant and floats centered between the potential of terminals $T_{1-R}$ and $T_{2-R}$. The bistable circuit $\mathbf{1}_{1-R}$ may now be connected across the zener diode $Z_{1-R}$ to control the switches $S_{3-R}$ and $S_{4-R}$ and, in turn, the transistors $Q_{1-R}$ and $Q_{2-R}$.

Figure 3B:
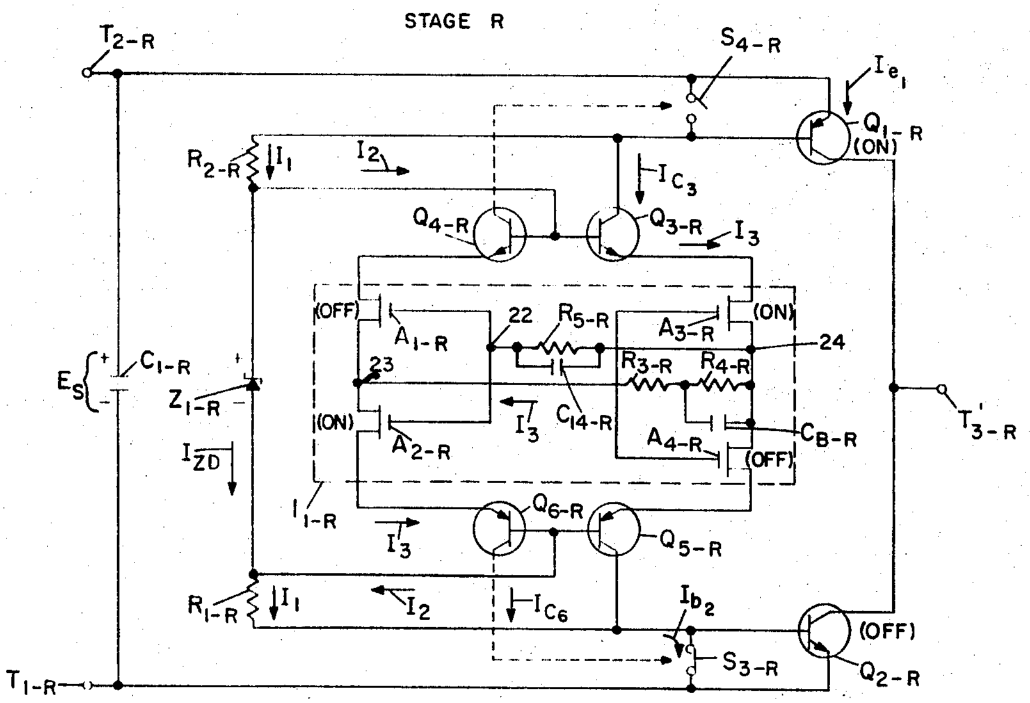

The bistable circuit $\mathbf{1}_{1-R}$ and a control section of the system are shown in detail in FIG. 3B. The functions of the transistors $Q_{1-R}$, $Q_{2-R}$, the zener diode $Z_{1-R}$ and the resistors $R_{1-R}$ and $R_{2-R}$ are as described in connection with FIG. 3A, but, as shown, a control circuit has been added across the zener diode $Z_{1-R}$. This control circuit includes transistors $Q_{3-R}$, $Q_{4-R}$, $Q_{5-R}$ and $Q_{6-R}$. The transistors $Q_{3-R}$–$Q_{4-R}$ form the buffer, marked $B_{1-R}$ in FIG. 3D and the transistors $Q_{5-R}$–$Q_{6-R}$ form the buffer marked $B_{2-R}$ that provide a buffer function for the bistable circuit $\mathbf{1}_{1-R}$ which comprises field effect transistors, $A_{1-R}$, $A_{2-R}$, $A_{3-R}$ and $A_{4-R}$, resistances $R_{3-R}$, $R_{4-R}$, and $R_{5-R}$, and capacitors $C_{B-R}$ and $C_{14-R}$. The transistors $Q_{3-R}$, $Q_{4-R}$, $Q_{5-R}$, and $Q_{6-R}$ are connected as emitter followers so that the current designated $I_3$ which passes through (powering) the bistalbe circuit $\mathbf{1}_{1-R}$ (which is a metal oxide semi-conductor memory circuit) is not derived in totaL from the zener diode $Z_{1-R}$ supply. This is important for two reasons: first, because the zener diode supply is not heavily loaded, it maintains its reference voltage which allows the bistable circuit $\mathbf{1}_{1-R}$ to be isolated from the rest of the circuitry (more on this point later), and, second, because $I_{c_6}$, which it turns out is equal to $I_{c_3}$, serves to keep switch $S_{3-R}$ closed and, therefore, $Q_{2-R}$ biased off. The relevant equalities for the various currents shown in FIG. 3B are:

$$I_{b_1} = I_{c_3} + I_1 \quad (9a)$$

$$I_1 = I_2 + I_{ZD} , \quad (9b)$$

$$I_{c_3} = \alpha_3 I_3 \quad (9c)$$

$$I_3 \approx V_{ZD}/(R_3 + R_4) \quad (9d)$$

$$I_{c_6} = \alpha_6 I_3 \quad (9e)$$

$$I_1 = I_2 + I_{ZD} \quad (9f)$$

$$I_{b_2} = I_1 . \quad (9g)$$

$\alpha_3$ and $\alpha_6$ in the above expressions are the current gains of transistors $Q_{3-R}$ and $Q_{6-R}$, respectively; $I_{b_1}$ is the base current of the transistor $Q_{1-R}$; $I_{c_3}$ is the collector current of $Q_{3-R}$, and the emitter currents $I_3$ flows through the resistors $R_{3-R}$ and $R_{4-R}$ having resistance values $R_3$ and $R_4$, respectively; $I_2$ is the base current of the transistors $Q_{3-R}$ and $Q_{6-R}$; $I_{ZD}$ is the current through the zener diode $Z_{1-R}$; and $I_{b_2}$ is the current through the switch $S_{3-R}$.

From FIG. 3B and equations (9*a*) through (9*g*), it can be seen that basically resistors $R_{1-R}$ and $R_{2-R}$ in conjunction with $E_s$ and the zener diode $Z_{1-R}$ form a zener regulated voltage source and this reference voltage in conjunction with resistors $R_{3-R}$ and $R_{4-R}$ set the value of the current $I_3$.

The bistable circuit $1_{1-R}$ is a complementary metal oxide semiconductor circuit consisting of a dual inverter connected as a bistable flip-flop. The state (1 or 0) of the flip-flop $1_{1-R}$ controls whether the transistors $Q_{3-R}$ or $Q_{4-R}$ and $Q_{6-R}$ or $Q_{5-R}$ conduct (the transistors $Q_{3-R}$–$Q_{6-R}$ and $Q_{4-R}$–$Q_{5-R}$ always conduct in pairs) and, therefore, whether the switch $S_{3-R}$ or the switch $S_{4-R}$ is closed, as is hereinafter discussed in greater detail in connection with FIG. 3C where the switching function of the switches $S_{3-R}$ and $S_{4-R}$ are performed by transistors $Q_{8-R}$ and $Q_{7-R}$, respectively. The state of switches $S_{3-R}$ and $S_{4-R}$, in turn, determine whether the transistor $Q_{1-R}$ or the transistor $Q_{2-R}$ is conducting.

Conceptually, any bistable circuit will suffice as the memory element. The chief reasons that field effect devices are used, instead of bi-polar semiconductors, are that they require a very small amount of power and because the metal oxide semiconductors shown have very low gate capacitance and are, therefore, relatively easy to trigger (impedance match) by use of the light sensitive diodes $D_{2-R}$ and $D_{4-R}$. Also, such use economizes in the number of electrical components.

The triggering of the bistable circuit $1_{1-R}$ is discussed in detail later; it is sufficient for now to note that when the circuit does change state the field effect devices $A_{2-R}$ and $A_{3-R}$ which were conducting, turn OFF (become an open circuit) and devices $A_{1-R}$ and $A_{4-R}$ become short circuits. After triggering, the polarity of the voltage across the capacitor $C_{B-R}$ will eventually reverse; but the charging processes to do this causes the transistors $Q_{4-R}$ and $Q_{5-R}$ to conduct heavily for a transistory period, which not only causes the switches $S_{3-R}$ and $S_{4-R}$ and the transistors $Q_{1-R}$ and $Q_{2-R}$ to switch rapidly, but also provides transistor overdrive for heavy output at the terminal $T_{3-R}$, as later discussed.

Figure 3C:
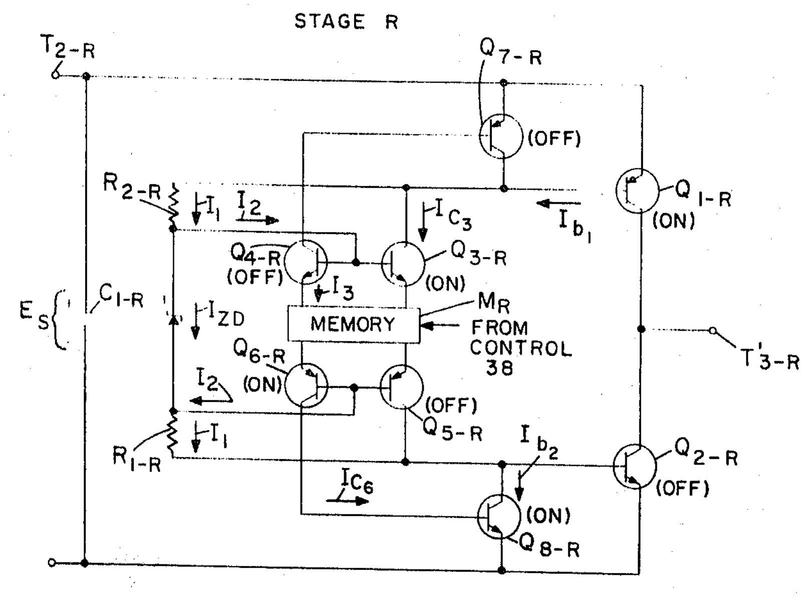
Figure 3D:
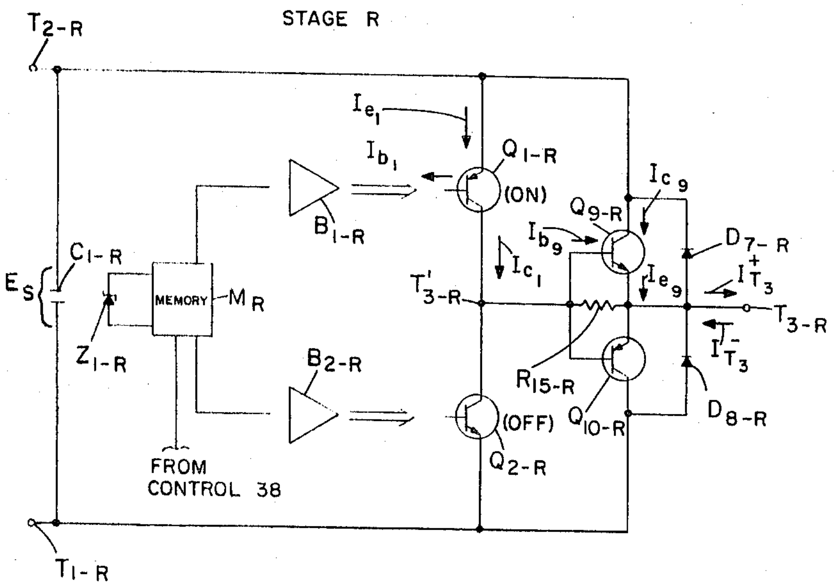

FIG. 3C shows how transistors $Q_{1-R}$ and $Q_{2-R}$ are controlled and how the switching functions of the switches $S_{3-R}$ and $S_{4-R}$ (which in FIGS. 3A and 3B are shown only as switch contacts) are actually accomplished, the switching functions being performed by the transistors $Q_{7-R}$ and $Q_{8-R}$, as above noted. The various currents are the same as in the previous figures; but, in FIG. 3C, it is is emphasized that the currents $I_{c_3}$ and $I_1$ contribute to the base drive for the transistor $Q_{1-R}$. The collector current labeled $I_{c_6}$ of the transistor $Q_{6-R}$ provides the base drive for the transistor $Q_{8-R}$ which acts as a "current sink" for current $I_{b_2}$, clamps the base of the transistor of $Q_{2-R}$ to its emitter, and keeps it in the non-conducting state.

When the bistable circuit $1_{1-R}$ is reset (by a light pulse), as later explained, the transistors $Q_{4-R}$ and $Q_{5-R}$ conduct and, therefore, the transistor $Q_{2-R}$ is ON and the transistor $Q_{1-R}$ is OFF because the transistor $Q_{7-R}$ is ON and the transistor $Q_{8-R}$ is OFF.

The conducting/ non-conducting states of the transistors $Q_{1-R}/Q_{2-R}$ effectively serve to connect the terminal $T_{3-R}$ either to the terminal $T_{1-R}$ or that terminal $T_{2-R}$. Thus, the bi-polar switching function necessary for the present apparatus is fulfilled —partially because the transistors $Q_{1-R}$ and $Q_{2-R}$ are bi-polar and provide a pseudo-short circuit for current flow in one direction only. In order to attain the bilateral current flow provided by a mechanical switch, additional components must be added as shown in FIG. 3D.

In FIG. 3D, if it is assumed for the moment that load current $(I_{T_3}^+)$ is flowing out of the terminal $T_{3-R}$, it can be seen that this current is provided by a transistor $Q_{9-R}$ in the form of emitter current $I_{e_9}$, most of which is drawn directly from the energy storage capacitor $C_{1-R}$ in the form of collector current $I_{c_9}$, where $$I_{c_9} = \alpha_9 I_{e_9}. \quad (10)$$

The base drive for the transistor $Q_{9-R}$ $(I_{b_9})$ is supplied in the form of collector current $I_{c_1}$ where $$I_{c_1} = I_{e_1}\alpha_1 = (1-\alpha_9)\, I^+_{T_3}, \quad (11)$$

and, therefore, $$I_{b_1} \geq I_{c_1}/\beta_1 = (b-\alpha_9/\beta_1)\, I^+_{T_3}, \quad (12)$$

where $$\beta_1 = \alpha_1/1-\alpha_1 .$$

In the above expressions $\alpha_1$ and $\alpha_9$ are the current gains in the transistors $Q_{1-R}$ and $Q_{9-R}$.

From FIG. 3D and equations (10) to (12), it can be seen that the transistor $Q_{9-R}$ is connected as an emitter follower and serves as a "buffer" between terminals $T'_{3-R}$ and $T_{3-R}$. This is only true, however, if the flow of the current is out of the terminal $T_{3-R}$. If the current is flowing in at the terminal $T_{3-R}$ $(I_{T_3}^-)$ and the state of the memory MR is such that the transistor $Q_{1-R}$ is supposed to be conducting, then the current $I_{T_3}^-$ flows through a diode $D_{7-R}$ and into the capacitor $C_{1-R}$. When the transistor $Q_{1-R}$ is ON, the transistor $Q_{9-R}$ and diode $D_{7-R}$ together allow bilateral current to flow (which simulates the mechanical switches $S_{1-1}$, $S_{1-2}$ . . . $S_{1-N}$) which is essential to connect the terminal $T_{3-R}$ to the terminal $T_{2-R}$.

In a like manner, a transistor $Q_{10-R}$ and diode $D_{8-R}$ serve as a bilateral switch when the transistor $Q_{2-R}$ is conducting. In this case, however, the diode $D_{8-R}$ conducts when the current $I_{T_3}^+$ flows and the transistor $Q_{10-R}$ conducts when the current $I_{T_3}^-$ flows; thereby performing the function of the switches $S_{2-1}$, $S_{2-2}$ . . . $S_{2-N}$.

FIG. 2 is a complete circuit diagram of one basic stage of the present apparatus, as above mentioned, and includes a resistance $R_{15-R}$ which is connected between the base and emitters of the complementary emitter follower pair $Q_{9-R}$, $Q_{10-R}$ to allow the terminal $T_{3-R}$ to rise (or fall) to the same potential as the terminal $T'_{3-R}$ in a static (no load) condition. Capacitors $C_{3-R}$, $C_{4-R}$, and $C_{5-R}$ are connected as shown for the following reasons: the capacitor $C_{5-R}$ supplies the charge for the current that occurs when the bistable circuit $1_{1-R}$ changes state (all four units therein are on for a short time) and thus allows the zener diode $Z_{1-R}$ to remain conducting at all times. This provides a filtering action to keep the voltage spikes from the bases of the transistor pairs $Q_{3-R}$—$Q_{4-R}$ and $Q_{5-R}$—$Q_{6-R}$, which if allowed to occur would be amplified by the transistors $Q_{1-R}$ and $Q_{2-R}$ and would appear at the output terminal $T_{3-R}$. The need for capacitors $C_{3-R}$ and $C_{4-R}$ stems not from the basic circuit per se, but they are needed when the stage is used in conjunction with other like stages to form a system like the PSC 101. With reference to FIG. 1, when any stage (except the stage 1 in the chain) is triggered, th entire stage including the switch, control, buffer, memory, etc., must be elevated in potential with respect to system ground. The capacitors $C_{3-R}$ and $C_{4-R}$ supply the reservoir of charge necessary to charge the stray capacitance associated with the control section of the stage to this elevated potential. If this charge were to be obtained by current flow through the bases of either of the transistor $Q_{1-R}$ or $Q_{2-R}$, it would be amplified and would appear at the output terminal $T_{3-R}$. The two integrator network designated $R_{8-R}$—$C_{8-R}$ and $R_{9-R}$—$C_{9-R}$ are connected as feedback paths around the transistors $Q_{2-R}$ and $Q_{1-R}$. These components serve an extremely important function whenever a given stage is not triggered yet others in the chain are. When this occurs, the non-triggered stage must carry heavy currents (in order to charge the output load) yet the output transistors $Q_{1-R}$ and $Q_{2-R}$ do not have the large transistory base current drive from the memory control buffers (it will be recalled that the voltage across the capacitor $C_{B-R}$ provides transitory current only when the bistable circuit $1_{1-R}$ is triggered) because the memory is not triggered and, therefore, not changing state. The feedback networks are designed to supply this large transient base drive required by the transistor $Q_{1-R}$ (or the transistor $Q_{2-R}$) in order to carry the heavy current. Diodes $D'_{6-R}$ and $D_{6-R}$ are clamp diodes to prevent damage to the emitter-base of transistors $Q_{7-R}$ and $Q_{8-R}$ when surge currents are carried by the capacitors $C_{6-R}$ and $C_{7-R}$; and resistors $R_{10-R}$ and $R_{11-R}$ act as d-c return paths for base-emitter circuit of $Q_{7-R}$ and $Q_{8-R}$.

Figure 3E:
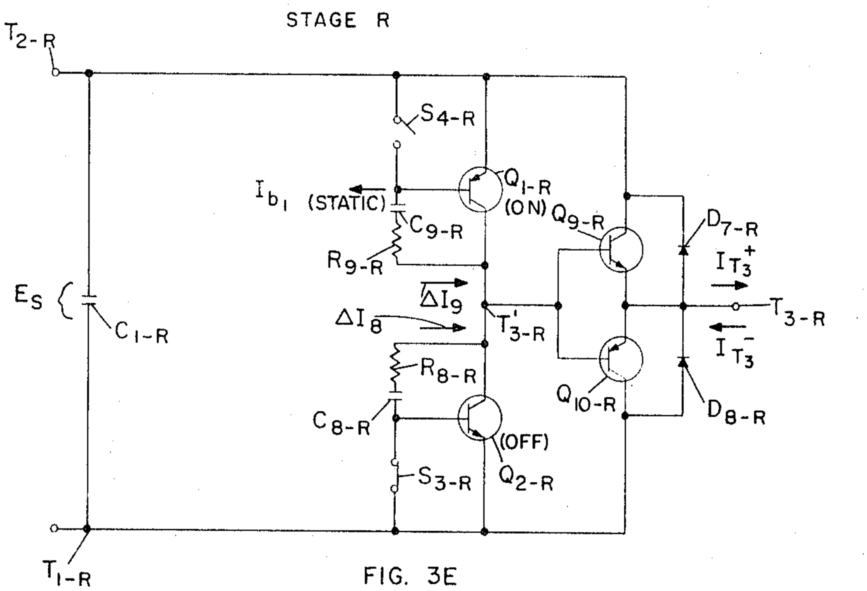

In this paragraph the three conditions, for which non-switching yet heavy current are required, are discussed with reference to FIG. 3E.

Condition 1: the transistor $Q_{1-R}$ ON, $I_{T_3}^-$ Surge

If the tranistor $Q_{1-R}$ is ON, a surge of current $I_T^-$ flows into the terminal $T_{3-R}$. This surge is carried by the diode $D_{7-R}$, and, therefore, no surge current is required to pass through either the transistor $Q_{9-R}$ or the transistor $Q_{1-R}$. (This is not strictly true; a little current is conducted by the transistor $Q_{9-R}$ and $Q_{1-R}$, which together act as an inverted transistor, but this does not present a problem.)

Condition 2: The transistor $Q_{1-R}$ ON, $I_{T_3}^+$ Surge

The condition in which the transistor $Q_{1-R}$ is conducting and a surge of current is required out of the terminal $T_{3-R}$ ($I_{T_3}^+$) presents a difficult problem in the circuit design. When this condition occurs, the transistors $Q_{9-R}$ and $Q_{1-R}$ are required to carry a heavy surge current yet the quiescent base current of the transistr $Q_{1-R}$ is very small. ($I_b$, static is set about 5 microamps to conserve standby power.) Since the transistor $Q_{1-R}$ has a comparatively small current capability ($\beta_1$ times 5 microamperes), the collector voltage at the transistor $Q_{1-R}$ will drop (the transistor $Q_{1-R}$ becomes unsaturated) and currents $\Delta I_9$ and $\Delta I_8$ will flow through resistors $R_{9-R}$ and $R_{8-R}$, respectively. The current $\Delta I_9$ is drawn from the base of the transistor of $Q_{1-R}$ which turns it on harder to compensate for the drop, i.e., the negative feedback provided by the resistor $R_{9-R}$ serves to enhance the Miller effect which in this case is a beneficial effect. The current $\Delta I_8$ on the other hand cannot turn ON the transistor $Q_{2-R}$ because the latter is back-biased (OFF) and the switch $S_{4-R}$ simply opens since this switch, as shown in FIG. 3C is an NPN transistor.

Condition 3: the transistor $Q_{2-R}$ ON, $I_{T_3}^-$

When the collector of the transistor $Q_{2-R}$ starts to rise, the current flows into the base of the transistor $Q_{2-R}$ and it is turned ON harder. This situation is completely analogous to the Condition 2 above. The capacitors $C_{9-R}$ and $C_{8-R}$ are connected in series with the resistors $R_{9-R}$ and $R_{8-R}$ in order to avoid directly coupling the feedback resistors. This would lead to an unnecessary increase in the required standby power because the feedback networks are required only under transient conditions and, even then, only when the stage itself is not switching but is required to pass considerable current. When the stage has been triggered (i.e., switched), the feedback networks impede switching because $\Delta I_9$ and $\Delta I_8$ are in the wrong sense (like a true Miller effect). This problem is overcome since transistors $Q_{7-R}$ and $Q_{8-R}$ effectively clamp the bases of the transistors $Q_{1-R}$ and $Q_{2-R}$ to their emitters thereby bypassing the Miller effect. Capacitors $C_{6-R}$ and $C_{7-R}$ in FIG. 2 are used as speed up capacitors.

The explanation in this and the next few paragraphs relates to the bistable circuit $1_{1-R}$ in FIGS. 2 and 3 B which is shifted to one or the other of its two stable states by the trigger circuit $2_{1-R}$. (In FIG. 3 B several circuit elements are placed within the dotted box labeled $1_{1-R}$; whereas in FIG. 2 these elements are placed outside the box.) The trigger circuit consists of the light sensitive elements $D_{2-R}$ and $D_{4-R}$ in FIG. 2 respectively activated by light emitting diodes $D_{1-R}$ and $D_{3-R}$ that are turned ON and OFF by signals from the control 38, as hereinafter discussed. The bistable circuit $1_{1-R}$ is in one state when the diode $D_{2-R}$ is pulsed and in the other state when the diode $D_{4-R}$ is pulsed, as now discussed.

The bistable circuit $1_{1-R}$ in FIGS. 2 and 3 B comprises the four field effect transistor $A_{1-R}$—$A_{4-R}$, operating in pairs. One transistor of a pair of an operating system 101 being conducting when the other is non-conducting (thus, the transistors $A_{2-R}$ and $A_{3-R}$ conduct at the same time and the transistors$A_{1-R}$ and $A_{4-R}$ conduct at the same time) to provide the two stable states of the bistable circuit. The input numbered 22 to the first pair $A_{1-R}$—$A_{2-R}$ is derived in part from the output numbered 24 of the second pair $A_{3-R}$—$A_{4-R}$ and in part from the light-actuated trigger means $2_{1-R}$. The input to the second pair $A_{3-R}$—$A_{4-R}$ is derived from the output labeled 23 of the first pair. It will be noted that the output 24 of the second pair of field effect transistors constitutes the bistable circuit $1_{1-R}$ output which is connected to control the bilateral switches.

In the bistable circuit $1_{1-R}$, the field effect transistors $A_{1-R}$ and $A_{3-R}$ are P-channel enhancement mode devices and the field effect transistor $A_{2-R}$ and $A_{4-R}$ are N-channel enhancement mode devices. The transistors $A_{2-R}$ and $A_{3-R}$ conduct at the same time and the transistors $A_{1-R}$ and $A_{4-R}$conduct at the same time, one pair being turned OFF when the other pair is turned ON. The transistors $A_{1-R}$ and $A_{2-R}$ are connected gate-to-gate as shown and drain-to-drain, the gates being connected for control to the common or series connection 25 between the diodes $D_{2-R}$ and $D_{4-R}$ and the non-common sources are connected between the points labeled 20 and 21. In operation, the point 20 is connected to the positive side of the zener diode reference supply through the transistor $Q_{4-R}$ and the point 21 to the negative side through the transistor $Q_{6-R}$. The voltage between points 20 and 21 is almost the voltage across the zener diode $Z_{1-R}$ . If the input terminal 22 to the field effect transistors $A_{1-R}$—$A_{2-R}$ is biased at less than one half the zener voltage, the device $A_{1-R}$ will be ON and the device $A_{2-R}$ will be OFF, thereby providing about 1,000 ohms between the output terminal 23 of the devices $A_{1-R}$ and $A_{2-R}$ and the positive point 20 and an open circuit between the output terminal 23 and the negative point 21. If the input terminal 22 is biased above one-half the zener voltage, the device $A_{1-R}$ will be OFF and the device $A_{2-R}$ will be ON resulting in about a 1,000 ohm resistance appearing between the output terminal 23 and the negative point 21. The gates of the field effect transistors $A_{3-R}$ and $A_{4-R}$ are also connected together and to the terminal 23; and the two drains of the devices are connected together and provide the output terminal 24. It should be apparent on the basis of the foregoing explanation that the output 23 will be up when the output 24 is down and vice versa. Since the output 24 controls in part the state of conduction of the transistors $Q_{7-R}$ and $Q_{8-R}$, it will be seen on the basis of the above discussion that, eventually, it also controls the state of conduction of the transistors $Q_{9-R}$ and $Q_{10-R}$.

Thus, the state of conduction of the devices $A_{1-R}$ and $A_{2-R}$ determines the voltage level at the first output terminal 23, and the voltage level at the terminal 23 determines the state of conducting of the devices $A_{3-R}$ and $A_{4-R}$ and thus the voltage level of the second output terminal 24. The resultant circuit $1_{1-R}$ is stable in either of two conditions: (*a*) when the first output 23 is high it holds the input to the devices $A_{3-R}$—$A_{4-R}$ high thereby holding the second output 24 low, in turn, holding the input to the device $A_{1-R}$ and $A_{2-R}$ low; and (*b*) when the first output 23 is low it holds the input to the devices $A_{3-R}$—$A_{4-R}$ low thereby holding the second output 24 high which, in turn, by way of the resistor $R_{5-R}$, holds the input to the devices $A_{1-R}$ and $A_{2-R}$ high. (The capacitor $C_{14-R}$ acts as a speed-up capacitor during switching.) Actual triggering of the bistable circuit $1_{1-R}$ from one to the other of its two stable states is effected by the trigger circuit $2_{1-R}$ (which is shown within two dotted boxes, but which, in fact, is one circuit) whose function is now explained.

The trigger circuit $2_{1-R}$ comprises the diodes $D_{2-R}$ and $D_{4-R}$ which are serially connected across the zener diode $Z_{1-R}$ to act as a voltage divider whose center voltage at the serial connection 25 is connected to the input 22 of the first pair of field effect transistors. The magnitude of the center voltage at 25 is variable, therefore, as a function of the electrical conductivity of the light-sensitive diodes $D_{2-R}$ and $D_{4-R}$, and the conductivity, in turn, is a function of radiation impinged upon said light-sensitive diodes. Since the light-emitting diodes $D_{1-R}$ and $D_{3-R}$ are respectively radiatively coupled to the diode $D_{2-R}$ and $D_{4-R}$, the conductivity of the latter is determined by the amount of light being emitted by the former at any instant of time. The light emitting diodes are controlled by the program control 38. Thus, the particular state of the bistable circuits $1_{1-1}$, $1_{1-2}$ . . . $1_{1-R}$ . . . $1_{1-N}$ of any particular stage is controlled, eventually, by the program control 38; since, as above noted, the state of the bistable circuit of a stage determines which side of the capacitors $C_{1-1}$ . . . is connected to the terminals $T_{3-1}$ . . . , the capacitors $C_{1-1}$ . . . can be connected in series or in parallel in a programmable fashion under the direction of the program control 38. The capacitors can be charged in series or in parallel, as discussed elsewhere herein, and can be discharged to a load in parallel or in series, as the case may be, and the magnitude of the voltage thereby delivered to the load is readily controllable.

Figure 4:
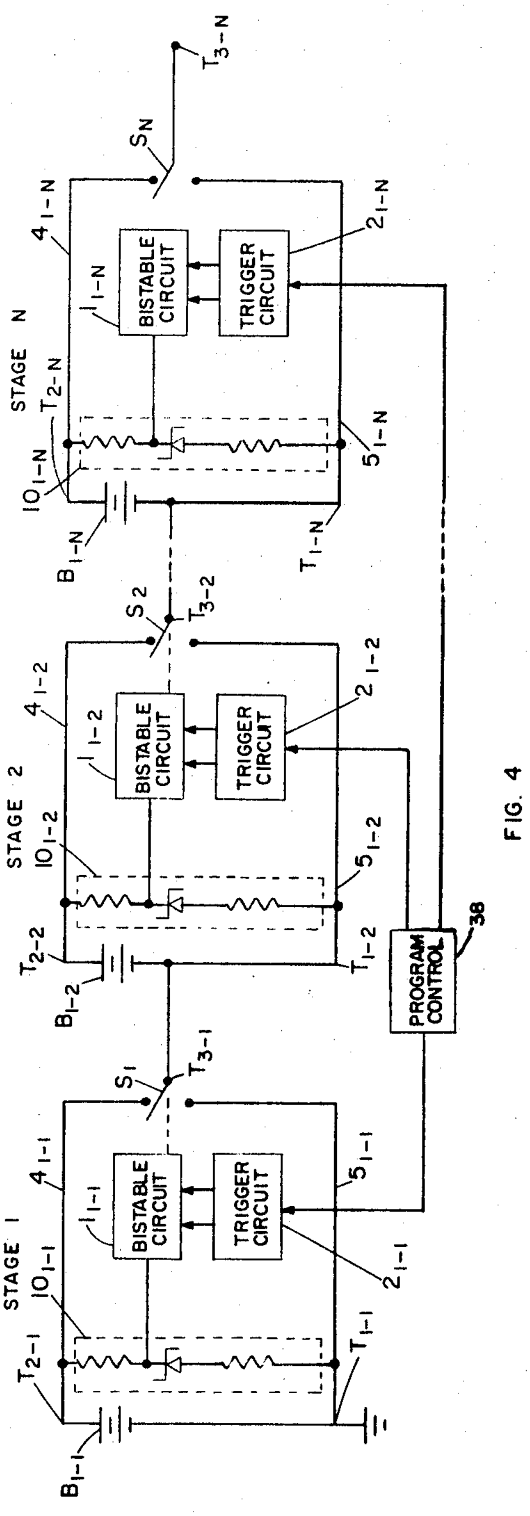
FIG. 4 is a schematic representation, partially in block diagram form, of a modification of the system of FIG. 1.
Figures 5, 6:
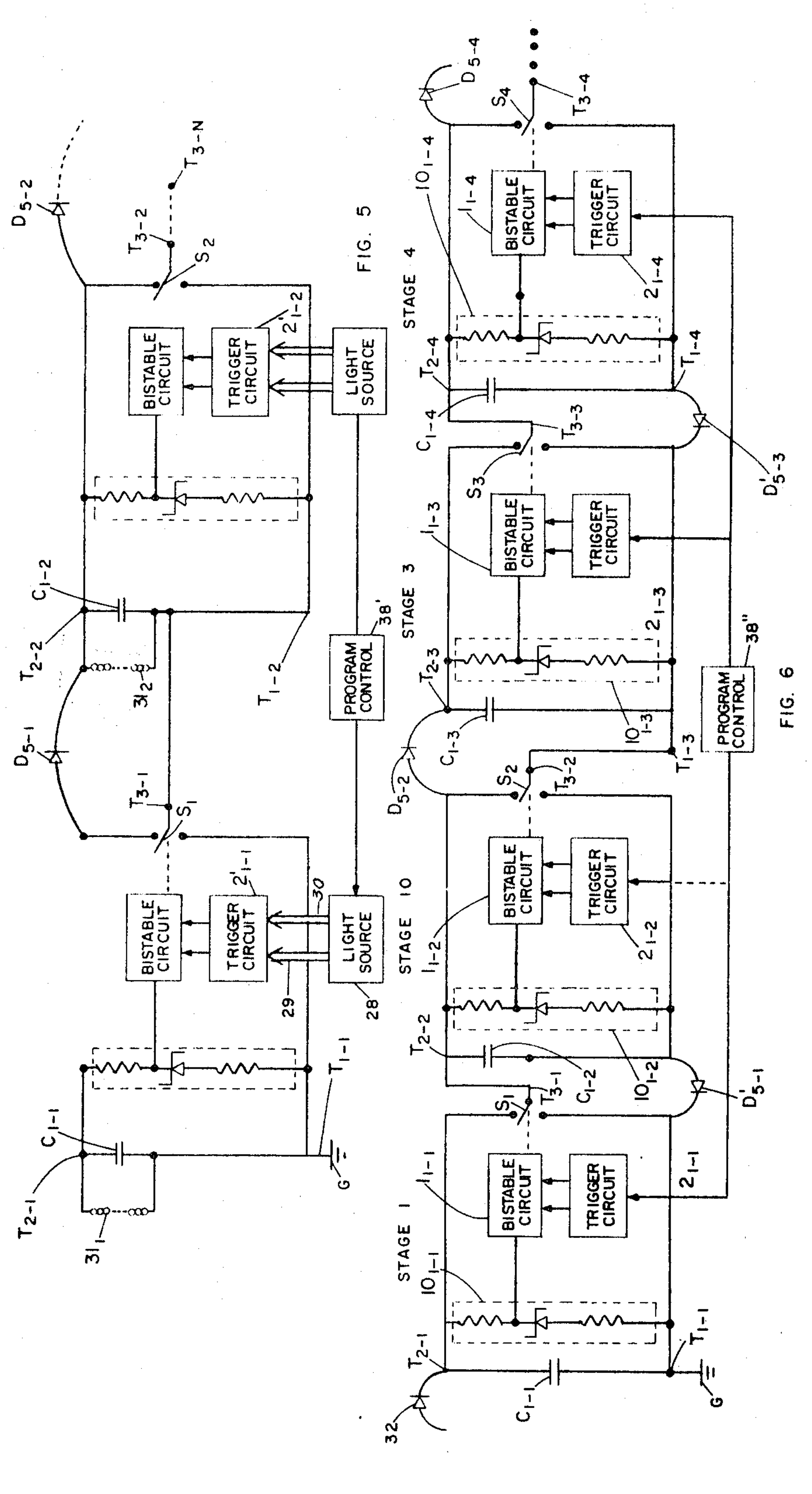
FIG. 5 is a schematic representation, partially in block diagram form, of a further modification.
FIG. 6 is a schematic representation, partially in block diagram form, of a still further modification.

The electric system shown schematically in FIG. 4, like that of FIG. 1, comprises a plurality of stages connected in cascade. Each stage includes, in combination, a supply voltage means $B_{1-1}$, $B_{1-2}$ . . . $B_{1-N}$, which is a battery in each instance, connected along the two alternate paths $4_{1-1}$, $4_{1-2}$ . . . $4_{1-N}$ and $5_{1-1}$, $5_{1-2}$ . . . $5_{1-N}$ to the respective terminals $T_{3-1}$, $T_{3-2}$ . . . $T_{3-N}$. Switch means $S_1$, $S_2$ . . . $S_N$ is again connected between the supply voltage means of each stage and the terminals $T_{3-1}$, $T_{3-2}$ . . . $T_{3-N}$, respectively, the switch means being operable to determine which path of the two paths $4_{1-1}$, $4_{1-2}$ . . . $4_{1-N}$ and $5_{1-1}$, $5_{1-2}$ . . . $5_{1-N}$ is conductive, thereby to determine which side (i.e., whether the terminals $T_{1-1}$, $T_{1-2}$ . . . $T_{1-N}$ or $T_{2-1}$, $T_{2-2}$ . . . $T_{2-N}$) of the supply voltage means is connected to the respective terminal $T_{3-1}$, $T_{3-2}$ . . . $T_{3-N}$. The light actuated bistable circuits $1_{1-1}$, $1_{1-2}$ . . . $1_{1-N}$ are connected to control the switch means $S_1$,$S_2$. . . $S_N$, as before, one state of each bistable circuit acting to render conductive one of said two paths and the other state of the bistable circuit acting to render conductive the other of said two paths as alternate conditions of system operation. All the circuit elements in FIG. 4 can be those described in connection with FIGS. 1 and 2 with the exception of the batteries $B_{1-1}$,$B_{1-2}$ . . . $B_{1-N}$. Similar remarks apply to the embodiment of FIG. 5 wherein the supply voltage means is shown comprising solar cells $31_1$ . . . and capacitors $C_{1-1}$ . . . , in combination. The trigger circuits in FIG. 5 are labeled $2'_{1-1}$ . . . and include light-sensitive diodes, but not light emitting diodes since light for triggering purposes is supplied by a light source 28 through light pipes 29 and 30. Control is provided by a program control 38'.

Figures 14, 15:
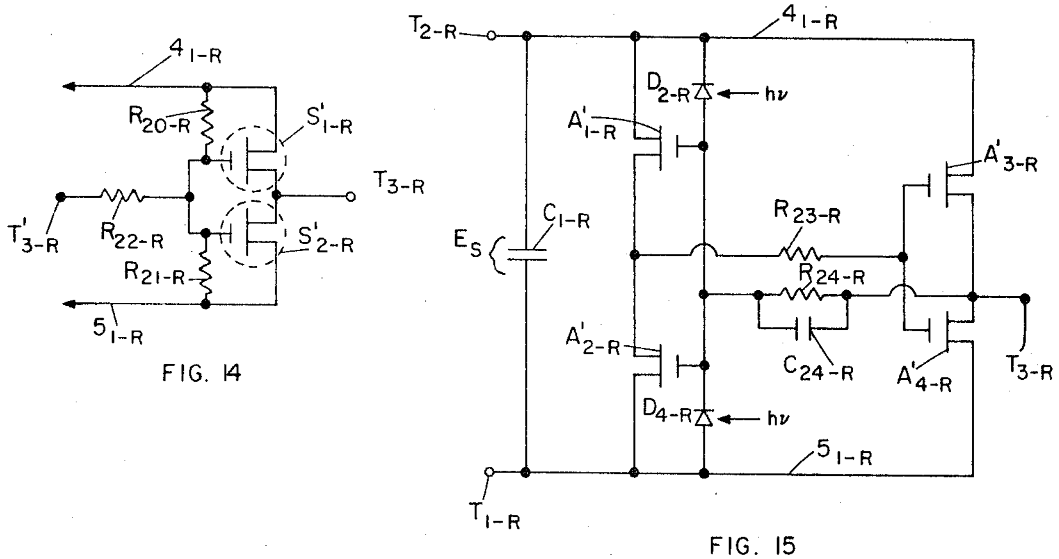
FIG. 14 shows schematically modified circuitry to replace some of the circuitry in FIG. 2.
FIG. 15 shows schematically a modification of the stage of FIG. 2.

In FIG. 14, the transistor and diode combinations making up the switches $S_{1-R}$ and $S_{2-R}$ in FIG. 2 are replaced by high voltage field effect transistors which are designated $S'_{1-R}$ and $S'_{2-R}$, the remainder of the stage being mostly like that shown in FIG. 2 with a few minor changes to accommodate the field effect devices. Thus there appear level setting resistors $R_{20-R}$ and $R_{21-R}$ and a resistor $R_{22-R}$ between the gates of the devices and the terminal $T_{3-R}$. The field effect switches $S'_{1-R}$ and $S'_{2-R}$ have about zero voltage drop when on and can be faster acting than the switches of FIG. 2.

The circuit in FIG. 15 is a single stage of a multiple-stage system adapted to perform the function of the circuitry of FIG. 2 but with fewer components. It contains some of the elements before discussed, e.g., the supply voltage means $C_{1-R}$ connected along alternate paths $4_{1-R}$ and $5_{1-R}$ to the electric terminal $T_{3-R}$ from the stage. A light-activated bistable circuit comprising field effect device $A'_{1-R}$, $A'_{2-R}$, $A'_{3-R}$ and $A'_{4-R}$ provides the means by which one or the other of the alternate paths is selected, one state of the bistable circuit acting to render conductive the path $4_{1-R}$ and the other state of the bistable circuit acting to render conductive the path $5_{1-R}$ as alternate conditions of system operation, as before discussed. The output terminal $T_{3-R}$ (or $T_{1-R}$—$T_{2-R}$ in a down conversion system) acts as the input to the next stage in the same manner as in the circuitry previously described. The field effect devices $A'_{1-R}$ . . . are complementary symmetry metal oxide semiconductors and they are actuated from one state to the other by electric pulses from the light sensitive diodes $D_{2-R}$ and $D_{4-R}$ which, in turn, conduct in response to light pulses $h\nu$. The devices $A'_{1-R}$ and $A'_{4-R}$ are caused to conduct when the diode $D_{2-R}$ conducts and are turned OFF when the diode $D_{4-R}$ conducts, the devices $A'_{2-R}$ —$A'_{3-R}$ being turned ON. In this configuration the devices $A'_{1-R}$ . . . must have the voltage capability to withstand the voltage $E_s$. Resistors $R_{23-R}$, $R_{24-R}$ and capacitor $C_{24-R}$ perform the same functions in this circuit as do the elements $R_{5-R}$, $R_{4-R}$ and $C_{B-R}$, respectively, in FIG. 2.

Figure 11:
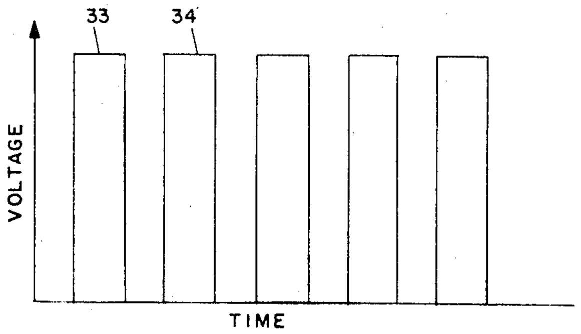
FIG. 11 shows a square voltage wave output from an electric system like that of FIG. 1.

In FIG. 11 there are shown several square-voltage wave pulses 33', 34' . . . which can be provided at the terminal $T_{3-N}$ of the system 101. On the other hand, the step-function wave shown at 35 in FIG. 12 can be supplied with the advantages later mentioned. In either situation the voltage at the terminal $T_{3-N}$ is d-c (or unidirctional). However, a system, like that shown in FIG. 6 and described in the next paragraph, can be employed to supply a single-phase,a-c voltage wave like the wave numbered 36 in FIG. 13, the wave designated 36' in FIG. 16, or some other waveform; three-phase or polyphase electric energy can also be supplied by connecting a plurality of the systems shown in FIG. 6 in polyphase configuration. The wave 36 is a step function like the wave 35 and with the same efficiency advantages, but square waves, like 33' and 34' can also be generated in the a-c system.

Figure 16:
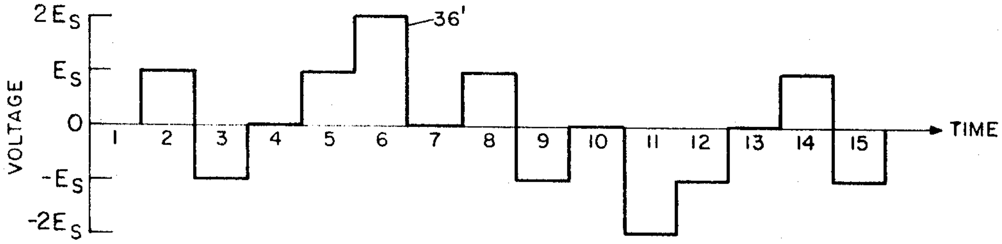
FIG. 16 shows the voltage output at $T_{3-4}$ of the four-stage system of FIG. 6 during various conditions of operation of that system.
Figure 13:
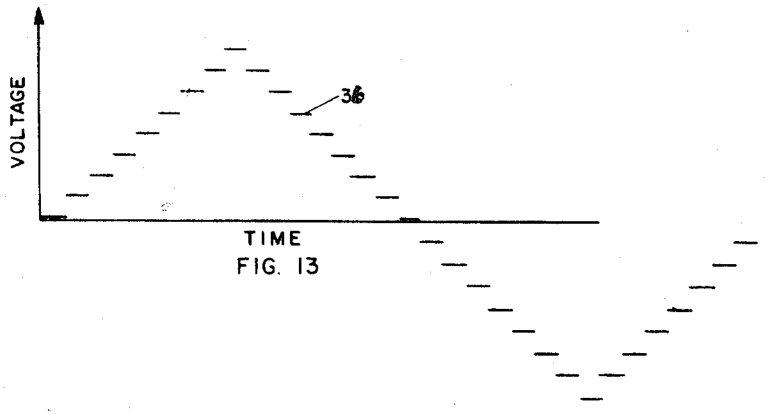
FIG. 13 shows a step-function voltage wave output from a system like the system of FIG. 6.

The circuitry of FIG. 6 shows a systemhich can provide, for example, an a-c output like that shown in FIG. 13, it being kept in mind that four stages only of a multi-stage system are shown to simplify the present explanation. Various voltage outputs at $T_{3-4}$ in FIG. 6 are shown in FIG. 16 for the conditions of system operation noted in Table 1 below. In Table 1 the designated "U" indicates that in the particular state of the system the switch (of the switches $S_1$,$S_2$,$S_3$ and $S_4$) in question is "up" and the designation "D" indicates that the particular switch is "down." Thus, by way of illustration, in State 2, the switch $S_1$ is up, switch $S_2$ is down, $S_3$ is up, and $S_4$ is up. The voltage at the output terminal $T_{3-4}$ in this situation, as shown in FIG. 16, is a multiple of the voltage $E_5$, i.e., the voltage across one of the capacitors $C_{1-1}$ . . . in the system of FIG. 6.

TABLE 1

| | $S_1$ | $S_2$ | $S_3$ | $S_4$ |
|---|---|---|---|---|
| **State 1** | U | D | U | D |
| **State 2** | U | D | U | U |
| **State 3** | U | D | D | D |
| **State 4** | U | D | D | U |
| **State 5** | U | U | U | D |
| **State 6** | U | U | U | U |
| **State 7** | U | U | D | D |
| **State 8** | U | U | D | U |
| **State 9** | D | D | U | D |
| **State 10** | D | D | U | U |
| **State 11** | D | D | D | D |
| **State 12** | D | D | D | U |
| **State 13** | D | U | U | D |
| **State 14** | D | U | U | U |
| **State 15** | D | U | D | D |
| **State 16** | D | U | D | U |

The system shown differs from that in FIG. 1 only in that the connection from the output $T_3$ of one stage to the input of the next succeeding stage (in a step-up system) alternates between the $T_1$ and the $T_2$ terminal, e.g., the terminal $T_{3-1}$ is connected to $T_{2-2}$, the terminal $T_{3-2}$ is connected to $T_{1-3}$, the terminal $T_{3-3}$ is connected to $T_{2-4}$, etc. The diodes $D_{5-2}$, $D_{5-4}$ etc., are connected as in FIG. 1, but the diodes labeled $D'_{5-1}$, $D'_{5-3}$ etc. are reversed, as shown. The system of FIG. 6 can, under the control of an appropriate control 38'', provide the waveform of FIG. 13, as mentioned, or the waveforms shown in FIGS. 11, 12 and 16. The program control 38' (or the other controls 38 and 38') can be simple commutator-type rotary switches, but it will be appreciated that more complex control systems such as hard-wired logic circuits or shift-register controls and the like, are contemplated (i.e., contemporary semiconductor logic systems). The system in FIG. 6 is intended to step a voltage up, but it will be appreciated that it can be modified to step a voltage down, similarly to the system hereinafter mentioned. The power source of FIG. 6 is, therefore, a-c or d-c, constant or variable voltage, as desired, constant or variable frequency (from zero to the kilocycle range, as needed), and single-phase, as shown, or polyphase.

Figure 12:
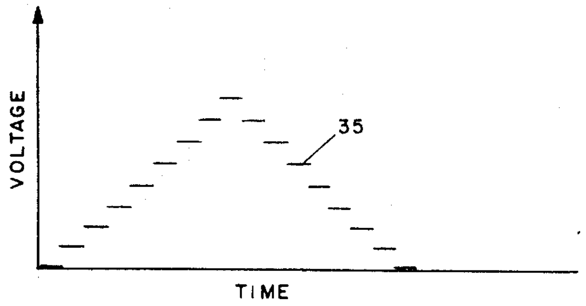
FIG. 12 shows a step-function voltage wave otuput from the system of FIG. 1.

Mention is made previously that the waves of the step voltage waveforms 35 and 36 of FIGS. 12 and 13 provide a much more efficient system of operation than do the square waves of FIG. 11 (whether d-c or a-c) when driving capacitive loads. A rigorous proof of that fact is contained in a report entitled "Switched Sources"(CSR-TR-72-2) deposited in the library system of the Massachusetts Institute of Technology, Cambridge, Mass. in or about June 1972 and hereby incorporated herein by reference. In order to keep the present specification to reasonable size that rigorous treatment is not repeated here, but a few conclusions are. The mathematics shows that the single step waveform, in such situation, results in a condition in which at least as much energy is dissipated in a parallel-series chain like the PSC 101, as is delivered to the load. In other words, the maximum efficiency of the system is 50 percent. However, when the energy is derived from a sequentially stepped wave like the wave 35, the energy dissipated in the PSC over the cycle is substantially less than the energy stored, and in such system operated in this way, the efficiency can approach a value as high as 97 percent. This result is important not only in situations in which the load is capacitive; it is important in the generation of high voltage for any purpose.

Figure 7:
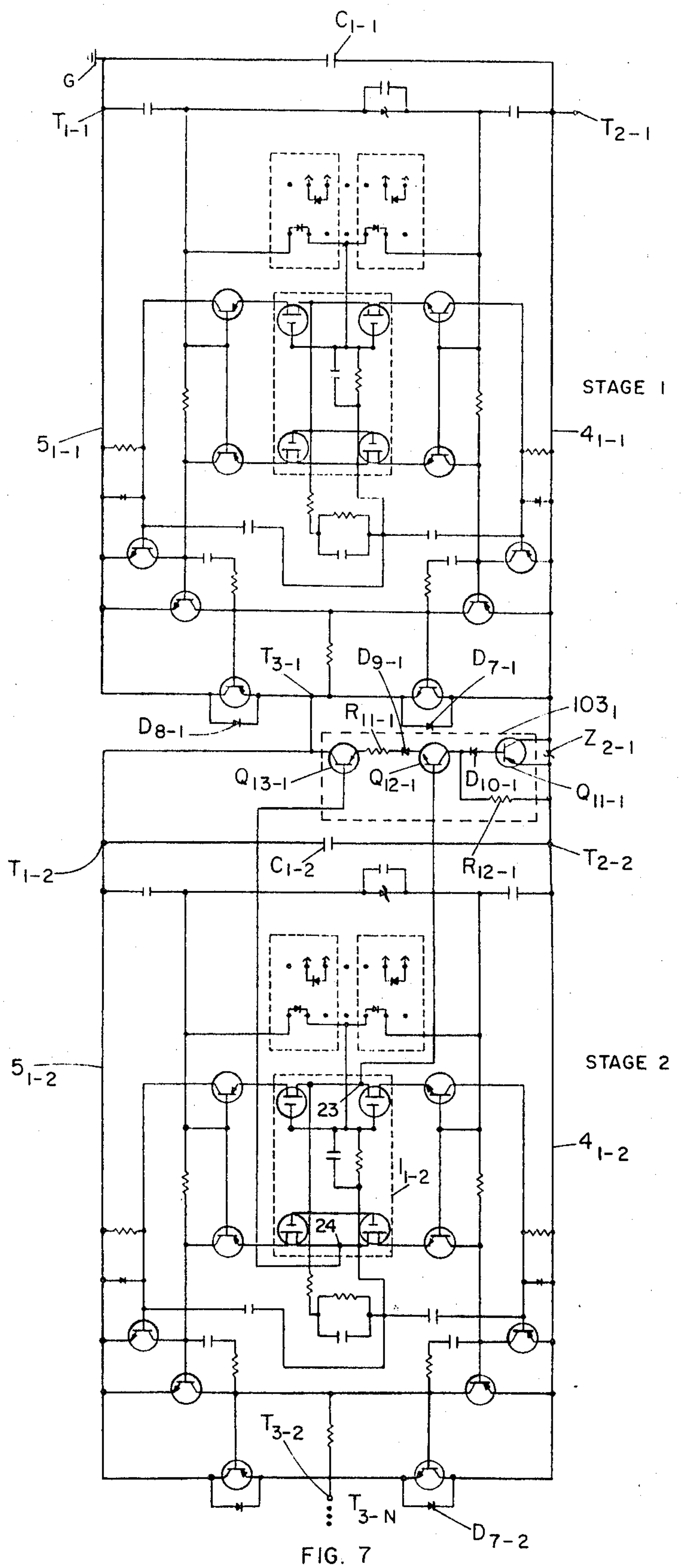
FIG. 7 is a schematic representation showing two stages of a multi-stage electric system adapted to step a voltage up and/or to step a voltage down from some high value to a lower voltage for applying to load.
Figure 8:
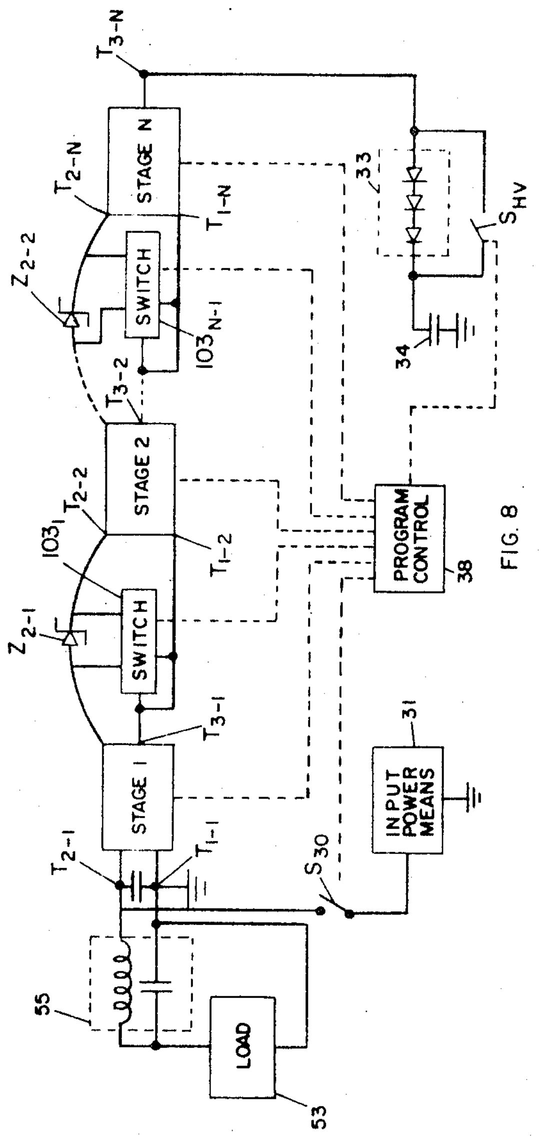
FIG. 8 shows schematically, and partially in block diagram form, a system employing multiple stages like the stages of FIG. 4.

The explanation in this paragraph is made principally with reference to FIGS. 7 and 8, and relates to an electric system adapted to step a voltage up or to step a voltage down. Two stages only, stage 1 and stage 2, are shown in FIG. 7 to simplify the description, it being understood that multiple stages, as indicated in FIG. 8, are contemplated. Elements in these two circuits which are the same as in circuits previously discussed, are identically marked; it will be noted that basically FIG. 7 contains two stages like the stages in FIG. 2 with a switch $\mathbf{103}_1$ connected in the system between stage 1 and stage 2, and the function of the diodes $D_{5-1}$ . . . of FIG. 1 is performed by zener diodes $Z_{2-1}$ . . . The system of these figures functions in the manner above mentioned to charge the capacitance storage 34 to some predetermined high value determined by the program control 38. During the charging cycle a switch $S_{30}$ is closed, and switch $S_{HV}$ is open, and the switches $\mathbf{103}_1$ . . . are open. (This is the previously discussed voltage-up conversion mode of PSC.) The storage capacitance can, at this juncture (the switch $S_{30}$ can be a wall plug used only to charge the capacitance or other storage means 34), then be discharged to a load 53 in what is termed a voltage-down conversion mode. When the PSC of FIG. 8 is operated as a voltage-down converter (e.g., when energy is extracted from the high-voltage capacitance 34 and delivered at low voltage to the load 53) the capacitors $C_{1-1}$...are charged in series from the capacitance storage means 34 and discharged in parallel to the load 53, a filter network 55 serving to even out the load voltage spikes as individual stages of the PSC are switched from the series to the parallel connection. Just as was the case when for the PSC was operating as a voltage-up converter and when there was a parallel connection for charging the individual supply voltage capacitors per stage and a series connection for discharging (transferring) power at high voltage, in the voltage-down converter there is a series connection when the individual stage supply voltage capacitors are charged from the high voltage source capacitance 34 with switch $S_{Hv}$ closed, switch $S_{30}$ open and the switches $\mathbf{103}_1$, $\mathbf{103}_2$ . . . $\mathbf{103}_{N-1}$ open, and a discharge mode when the energy stored on the stage capacitors is transferred to the load by connecting each stage successively in parallel across the load and with switch $S_{Hv}$ open, switch $S_{30}$ open and switches $\mathbf{103}_1$, $\mathbf{103}_2$ . . . $\mathbf{103}_{N-1}$ being closed in order. (The switch $S_{30}$ can be a diode and, as later shown, and the switches $\mathbf{103}_1$ . . . and the switch $S_{HV}$ can be solid state semiconductor switching circuitry.) It is assumed now that the capacitance storage 34 has been charged to some predetermined high voltage and the down-conversion mode is called for by signals from the program control 38. With the switches in the condition above noted, a circuit is completed from ground G through the capacitance storage 34, through the switch $S_{HV}$ to the terminal $T_{3-N}$ and, eventually, to the terminal $T_{3-2}$. From the terminal $T_{3-2}$ the circuit is through the diode $D_{7-2}$, along the conductive path $\mathbf{4}_{1-2}$, through the capacitor $C_{1-2}$, through the diode $D_{7-1}$, along the conductive path $\mathbf{4}_{1-1}$ and through to capacitance $C_{1-1}$ to ground. In this way the capacitors $C_{1-1}$ . . . are charged in series from the capacitance storage means 34. At this point, the switch $S_{HV}$ is opened. In this latter situation, the terminal $T_{2-1}$ (and thus the capacitor $C_{1-1}$) is connected across the load 53 to ground G. The terminal $T_{2-2}$ (and thus the capacitor $C_{1-2}$) is also connected across the load 53 to ground G, the circuit being from $T_{2-2}$, (by closing the switch $\mathbf{103}_1$) along the path $\mathbf{4}_{1-1}$ to the terminal $T_{2-1}$, through the load 53 to ground G and to the terminal $T_{1-1}$, along the path $\mathbf{5}_{1-1}$, through the diode $D_{8-1}$ to $T_{3-1}$ and $T_{1-2}$; and, it will be seen on the basis of the foregoing that the other terminals $T_{2-3}$ . . . $T_{2-N}$ are also connected successively across the load 53 to ground G. In other words, eventually all the capacitors $C_{1-1}$, $C_{1-2}$ . . . $C_{1-N}$ are connected in parallel across the load. When the last capacitor $C_{1-N}$ has been discharged (to a predetermined level) to the load, the PSC is triggered to the series mode and is ready to be re-charged by the capacitance 34, thereby to start a new cycle as above described. Only so many of the elements of FIG. 7 as are necessary to the explanation in this paragraph are marked since no useful purpose would be served by marking all the circuit elements. In the next paragraph, the operation of the switches $\mathbf{103}_1$ . . . is discussed, this is followed by an explanation of a solid state switch to serve as the switch $S_{HV}$, and this is followed by a discussion of a simplified voltage step down system since, as will be appreciated from the above explanation, the bilateral feature of the switches $S_{1-1}$, $S_{1-2}$ . . . is not required in a situation in which step down alone is needed, the switch function being replaced by the diode function of diodes $D_{7-1}$ . . . and $D_{8-1}$ . . . , as above noted.

It will be appreciated that electric current in the circuit of FIG. 7 will flow from stage 1 to stage 2 through the zener diode $Z_{2-1}$ irrespective of the condition of the switch $\mathbf{103}_1$; the function of the latter is, then, to allow current to flow from stage 2 to stage 1. In the switch $\mathbf{103}_1$, a transistor $Q_{11-1}$ is turned ON when the transistors shown at $Q_{12-1}$ and $Q_{13-1}$ conduct; the transistors $Q_{12-1}$ and $Q_{13-1}$ conduct when the terminal 23 in the next succeeding stage is positive with respect to the terminal 24 in the same stage, and the relative voltage levels of these two terminals depends on the state of the bistable circuit of which they are a part—in this case the circuit $\mathbf{1}_{1-2}$. In this manner the state of the bistable circuit of the next succeeding stage determines when the switch $\mathbf{103}_1$ is ON and when it is OFF, e.g., the bistable circuit of stage 2 controls the condition of conduction of the switch $\mathbf{103}_1$, the bistable circuit of stage 3 controls the condition of conduction of the switch $\mathbf{103}_2$, and the bistable circuit of stage N controls the conduction of the switch $\mathbf{103}_{N-1}$. The terminal 23 in each bistable circuit is positive with respect to the terminal 24 when the bistable circuit is in the reset state, that is, when the stage is in the parallel mode. In the circuitry of the switch $\mathbf{103}_1$, a resistance $R_{11-1}$ sets the current base drive for the transistor $Q_{11-1}$; and diodes $D_{9-1}$ and $D_{10-1}$ serve the functions now discussed. The diode $D_{9-1}$ is a blocking diode to keep an excessive reverse voltage from the emitter of the transistor $Q_{12-1}$, and the diode $D_{10-1}$ in conjunction with the resistor $R_{12-1}$ prevents the transistor $Q_{11-1}$ from being turned on by leakage current in its back biased collector junction.

Figure 10:
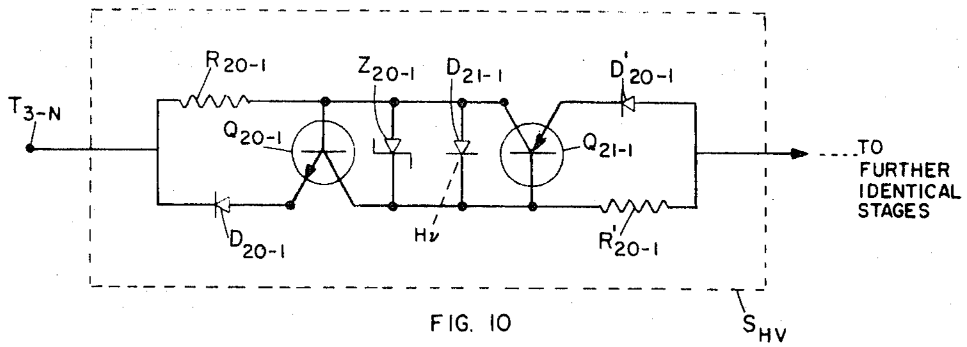
FIG. 10 shows schematically one stage of the switch labeled $S_{HV}$ in FIGS. 7 and 8.

The switch $S_{HV}$, as shown in a preferred form in FIG. 10, is a light actuated semiconductor switch comprising a plurality of stages, like the single stage shown, serially connected. When the system of FIG. 7, for example, is in the parallel mode, the switch $S_{HV}$ is open, as mentioned; it must, therefore, withstand the high voltage across the capacitance 34. This is accomplished, again, by making the switch modular, thus restricting the voltage gradient in the unit to that across the individual modules thereof, and again, by employing light as the actuator. The stage of the switch module shown consists of an NPN transistor $Q_{20-1}$ and PNP transistor $Q_{21-1}$ connected so that positive feedback occurs whenever either transistor starts to conduct. When the switch $S_{HV}$ is conducting each stage or module thereof is a low impedance path (essentially two forward-biased diodes in series). When the switch $S_{HV}$ is OFF, the transistors $Q_{20-1}$ and $Q_{21-1}$ are held in the non-conducting state by the circuit action of diode-resistor combinations $D_{20-1}$–$R_{20-1}$ and $D'_{20-1}$–$R'_{20-1}$. A pulse of light directed upon the light-sensitive diode shown at $D_{21-1}$ causes the diode to become a relatively low impedance path thereby allowing enough current to flow to forward bias the emitter of one (or both) of the transistors $Q_{20-1}$ and $Q_{21-1}$ causing the latter to conduct. The switch $S_{HV}$ is then ON. After enough current has gone into the series capacitors $C_{1-1}, C_{1-2} \ldots C_{1-N}$ in the embodiment of FIG. 7 to charge them in series to the potential of the high voltage capacitance 34, the current through the switch $S_{HV}$ drops to zero and it turns OFF, automatically.

Figure 9:
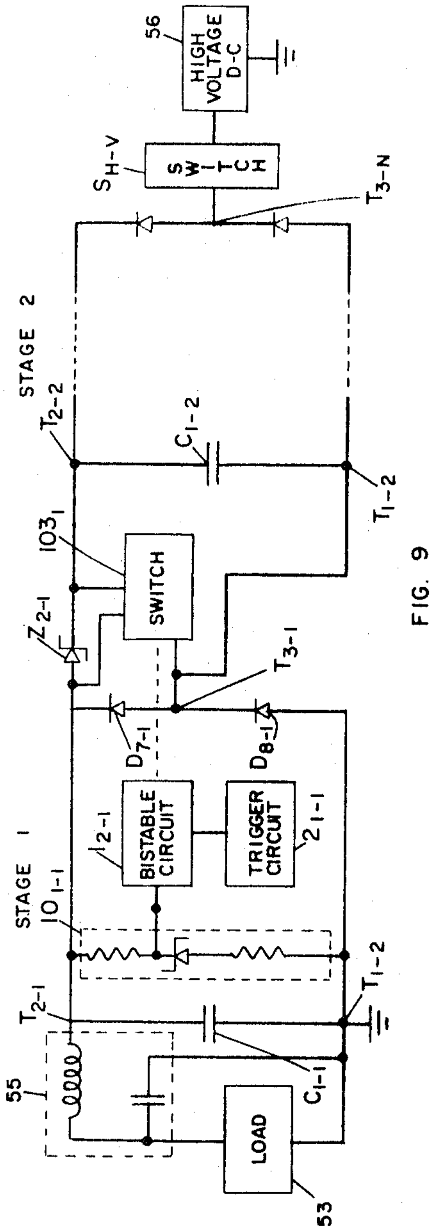
FIG. 9 is a schematic representation, partially in block diagram form, of a modification of the system of FIG. 8.

The relatively sophisticated system for down conversion described above is needed when the system is used to accomplish both up and down voltage conversion. If only down conversion of voltage is desired, a simplified system can be employed, as is shown in FIG. 9. In FIG. 9 Stage 1 only is shown in any detail since all the elements are shown and discussed in connection with other figures, with the exception of a high-voltage d-c source 56. As is noted in the previous paragraph, the bilateral switches $S_{1-1}, S_{2-1} \ldots$ can be replaced by the diodes $D_{7-1} \ldots, D_{8-1} \ldots$, and that is done in the circuitry of FIG. 9, with a reduction of a great deal of the circuit elements shown in FIG. 7. Also, by adjusting the breakdown voltage of each zener diode $Z_{2-1} \ldots$ or by placing varied-valued resistors in series with these diodes, the charges of the capacitor $C_{1-1}, C_{1-2} \ldots C_{1-N}$ can be varied to compensate for voltage drop during discharge; this latter possibility can be employed in other circuits discussed herein, as well.

The circuitry described above can, of course, be formed on circuits boards or the like, but the preferred form of the stages is an IC chip, smaller than a dime in many situations, each such chip including all the elements in FIG. 2. Thus, a 10,000 volt or more power supply can be fabricated by cascading, say, a hundred such chips, the voltage $V_1$ in this situation being one hundred volts; and of course a plurality of the chains making up the source 101 in FIG. 1 can be used by appropriate series and/or parallel connections to give any desired current and voltage output characteristics. The voltage across each stage never exceeds the voltage across the $C_1$ capacitor of that particular stage. The parasitic losses associated with charging the capacitance of a chip body depend to some extent on how the IC chips are packaged (i.e., arranged). At present, vertically stacked chips and a tandem spiral configuration (wherein the chips are placed edge-to-edge) are believed to be the best of the possibilities. Without going into all the calculations that have been made in this connection, it is sufficient to note that the vertical stacking appears to be the better. Reference to expressions (3) and (4) indicates that, since the losses in any chain of a system 101 are constant, the efficiency of the system is a function of the power out. Thus, a large power source can be made up of a large number of chains which can be paralleled to feed loads of kilowatt capacity, but the number of parallel chains can be changed, as load requirements change, thereby keeping the source 101 efficiency at a high level (≈97 percent), it being kept in mind that such efficiency will vary depending on design parameters such as, for example, the output voltage, frequency of switching (≈100 to 1000 Hz for many power uses). The system is not restricted, however, to large power outputs, e.g., it can be employed to supply a constant d-c voltage (or a predeterminedly variable voltage) output to a control load requiring milliwatts or a constant d-c voltage (or a predeterminedly variable voltage) output to a load requiring watts. Also, the chains can be employed in a matrix with random control of the stages. Also, the light-sensitive diodes $D_{2-R}$ and $D_{4-R}$ can be replaced for some purposes by solar cells. In addition, it will be appreciated on the basis of the foregoing description that in a PSC, one switch in a stage (e.g., $S_{1-1}$) is always simultaneously being opened when the other switch in the stage (i.e., $S_{2-1}$) is being closed, and, thus, there is a smooth transition between the open and closed conditions—unlike mechanical switches (relays). In addition, relays are large, heavy, wear out, slow-acting, chatter, etc. What is needed is a solid state switch which is bilateral and that has memory so that triggering can be done with pulses of light in order to avoid using high voltage coupling capacitors which would dissipate power due to the charging and discharging; the voltage gradients in the system impose the voltage $E_s$ only across each state. The basic switch must also be designed such that it can handle the large currents when it itself is not being triggered. This is to allow stages to be triggered in any sequence, thus making possible the attractive programmable feature which is useful in a wide range of situations. Further, the solid state switch should work over a wide range of voltages, and be designed such that it can be readily packaged in integrated circuit form utilizing readily available solid state circuit chips.

While it is not necessary for an understanding of the system to assign values to the various circuit elements above mentioned, a few such values may be useful and are given in this paragraph. These are the magnitudes in a particular parallel series chain built in accordance with the present teachings and tested and in actual tests provided waveforms similar to those shown in FIGS. 11 and 12 up to voltages of 1200 volts. Further values may be obtained from said report. These values include: $C_{1-R}$—2 microfarads, $R_{1-R}$ and $R_{2-R}$—6.8 megohms, $C_{3-R}$ and $C_{4-R}$—10,000 picofarads, $C_{3-R}$ and $C_{9-R}$—200 picofarads, $C_{8-R}$—3,000 picofarads, $R_{4-R}$—2 megohms, $C_{6-R}$ and $C_{7-R}$—100 picofarads, $R_{10-R}$ and $R_{11-R}$—1 megohms, $C_{5-R}$—10,000 picofarads.

Modifications of the invention herein described will occur to persons skilled in the art and all such modifications are considered to be within the spirit and scope of the invention as defined in the appended claims.

What is claimed is:

1. A low-power-loss, light-triggered, high-voltage electric power source comprising a plurality of stages, each stage including, in combination, constant-voltage reference voltage means, a set of dual bilateral solid-state switches, each stage in the energized source being at all times connected to the next succeeding stage through one switch of the set, one switch of the set being opened when the other switch of the set is closed, light-sensitive means associated with each set of switches and operable to open one switch of the set while simultaneously closing the other switch of the set in response to electromagnetic radiation directed upon said light sensitive means, the reference voltage means acting as a source of constant reference voltage to control switching.

2. An electric power source as claimed in claim 1 which includes electric energy storage means in each stage, the energy storage means in the stages during one operating state of said source being connected in parallel to effect charging thereof and at least some of the storage units making up the energy storage means being connected, during another operating state of said source, in series to provide a high voltage output during the latter-named operating state, the reference voltage being derived from the energy storage means and being referenced to the energy storage means.

3. An electric power source as claimed in claim 2 in which the solid-state switches comprise two transistors interconnected, each having a diode connected thereacross, each transistor being adapted, when appropriately biased, to carry electric current in one direction and each diode being connected across its associated transistor so as to carry electric current in the other direction, thereby to provide the bilateral current-carrying characteristics of each switch.

4. An electric power source as claimed in claim 3 in which the transistors are biased by a control circuit that comprises four field effect devices connected to form a bistable circuit, the bistable circuit being switched by electric pulse signals from two light-sensitive diodes connected to the respective gates of the field effect devices and acting as trigger means for the bistable circuit, said bistable circuit acting as a memory element.

5. An electric power source as claimed in claim 4 which includes means for directing light pulse energy alternately upon the two light-sensitive diodes to effect an increased conduction of one or the other of the light-sensitive diodes to trigger the bistable cicuit.

6. Apparatus as claimed in claim 4 that further includes two light-emitting diodes coupled to direct radiation in the form of pulses upon the light-sensitive diodes, the coupled radiation acting as set-reset means for the bistable circuit.

7. A low-power-loss, light-triggered, electric power source comprising a plurality of stages, each stage including, in combination: voltage supply means, reference voltage means, a set of dual bilateral solid-state switches connected between the voltage supply means and an output from the stage, floating bistable circuit means comprising field effect devices connected to control said set of switches, one switch of the set being opened when the other switch of the set is closed, light-sensitive means associated with the floating bistable circuit means and adapted to trigger said circuit, thereby to open one of said switches while simultaneously closing the other, the reference voltage means acting as a source of constant voltage to control switching.

8. Apparatus as claimed in claim 7 that further includes means connected to receive, as an input thereto, a voltage output from said source and operable to step the voltage down to a desired lower voltage level.

9. Apparatus as claimed in claim 8 in which the voltage step-down means comprises a plurality of further stages, each further stage including, in combination: a further floating bistable circuit comprising field effect devices connected to control a further set of switches, one switch of the further set being opened when the other switch of the further set is closed, light-sensitive means associated with the further floating bistable circuit and operable to trigger the associated circuit, thereby to open one of the switches of the further set of switches while simultaneously closing the other to connect the further stages serially or in parallel as alternate states of operation.

10. Apparatus as claimed in claim 7 that includes high capacity electric energy storage means connected to the outputs of the last stage of the plurality of stages, the high voltage provided being stored in the storage means, and that includes circuitry operable to step the high-voltage stored energy down to a desired voltage level.

11. Apparatus as claimed in claim 10 in which the energy storage means is a storage capacitance, the capacitance being charged by a voltage connected thereto by serially connecting the stages across the storage capacitance, switching circuitry means being provided between each stage to effect discharge of the storage capacitance as an alternate state of operation.

12. Apparatus as claimed in claim 7 in which the floating voltage supply means in each stage includes a capacitor and in which means is provided to charge the capacitor periodically to a predetermined voltage level.

13. Apparatus as claimed in claim 12 in which the output from one stage is connected as an input to the next succeeding stage through said set of switches and which includes a further connection between adjacent stages, said further connection being a diode connected to conduct electric current in the forward direction from one stage to said next succeeding stage, and by-pass switch means connected across the diode and adapted, when conductive, to conduct electric current in the reverse direction.

14. Apparatus as claimed in claim 13 which includes energy storage capacitance means connected through diode means to the output of the last stage of the plurality of stages and by-pass switch means connected across the diode means, the capacitance storage means being charged to a high voltage by charging said capacitors in parallel and discharging them in series as an input to the capacitance storage means thereby to achieve a high voltage input to the capacitance storage means in one state of operation of the apparatus, means connecting said capacitors in series to the energy storage capacitance means to charge the capacitors from the energy storage capacitors means in another state of operation, and means for connecting the thusly charged capacitors in parallel across a load.

15. A low-power loss, light triggered electric power source having, in combination, supply voltage means, floating reference voltage means connected to the supply voltage means, bilateral switch means, light-sensitive means associated with a floating bistable circuit means and adapted to trigger said bistable circuit means, thereby to switch the switch means from one to the other of two states to provide a set-reset function, the reference voltage means acting as a source of constant voltage referenced to said supply voltage means to control switching.

16. A method that comprises, establishing a supply voltage, deriving a center referenced reference voltage from the supply voltage, providing bilateral alternate electrically conductive paths for passage of electric current between one side or the other of the supply voltage and an output, and effecting switching from one to the other of said alternate paths in response to light signals, the reference voltage acting as a source of constant voltage to control said switching.

17. A low power-loss method of effecting control of the voltage delivered to the output of an electric power source, that comprises, establishing a floating supply voltage at a predetermined voltage level, deriving a reference voltage from the floating supply voltage, providing bilateral alternate electrically conductive paths between one side or the other of the floating supply voltage and the output, and effecting switching from one to the other of said alternate paths in response to light signals, thereby, as alternate conditions, to connect one side or the other of the floating supply voltage to said output, the reference voltage acting as a source of constant voltage referenced to said floating supply voltage to control said switching.

18. An electric system that comprises a plurality of stages connected in cascade, each stage including, in combination, supply voltage means connected along alternate electric paths to an electric terminal of the stage, bilateral solid-state switch means electrically connected in said paths and operable to connect either one side or the other of the supply voltage means to said terminal as alternate states of system operation, reference voltage means connected to the supply voltage means and adapted to derive a center-referenced control voltage therefrom, floating bistable circuit means connected to control the switch means, light-sensitive means operable to trigger said bistable circuit means to effect switching from one to the other of said states, the reference voltage means acting as a source of constant voltage referenced to the supply voltage to control switching.

19. An electric system as claimed in claim 18, which is operable to act as a high-voltage source of electric energy and in which the supply voltage means includes a capacitor.

20. An electric system as claimed in claim 19 which includes rectifier means connected between the capacitor of each stage and an a-c input to the system.

21. An electric system as claimed in claim 18 in which the supply voltage means is a battery in each stage.

22. An electric system as claimed in claim 18 in which the supply voltage means comprises a capacitor and a solar cell, in combination, in each stage.

23. An electric system as claimed in claim 18 in which the system is adapted to connect to an outside source of electric energy and which includes rectifier means between the input to the system and the supply voltage means, said supply voltage means comprising a capacitor in each stage of the system.

24. A system as claimed in claim 23 in which there is provided a diode between each stage, said diode being connected to carry current from the input side of the system toward the output thereof.

25. A system as claimed in claim 24 in which the supply voltage means comprises a capacitor and a solar cell array, in combination, in each stage of the system.

26. A system as claimed in claim 24 that further includes bypass switch means connected across each said diode and adapted, when conductive, to conduct electric current in the reverse direction.

27. Apparatus as claimed in claim 26 that includes energy storage capacitance means connected through diode means to the output of the last stage of the plurality of stages and bypass switch means connected across the diode means, the storage capacitance means being charged to a high voltage by charging said capacitors in parallel and discharging them in series as in input to the capacitance storage means thereby to achieve a high voltage input to the capacitance storage means in one state of operation of the apparatus, means connecting said capacitors in series and to the capacitance storage means to charge the capacitors from the capacitance storage means in another state of operation, and means for connecting the thusly charged capacitors in parallel across a load.

28. An electric system as claimed in claim 18 in which the supply voltage means includes a capacitor in each stage, means being provided to connect the capacitors in series across a high voltage for charging and to connect the capacitors in parallel across a load, thereby to step the high voltage input to a lower more desirable voltage at the output from the system.

29. An electric system as claimed in claim 18 in which the supply voltage means includes a capacitor in each stage, means being provided to connect the capacitors in parallel to allow charging thereof and for connecting the capacitors in series to allow discharge thereof to a load.

30. A system as claimed in claim 18 in which the supply voltage means includes capacitors and having rectifier means between the capacitors and an input to the system, means being provided to place the capacitors in parallel to allow charging thereof to a predetermined voltage and for connecting the capacitors in series or in a series parallel pattern to allow discharge of the capacitors to a load.

31. A system as claimed in claim 30 that includes diodes connected between stages to allow current to pass from one stage to the next in the charging state of the system operation.

32. A system as claimed in claim 31 which further includes control means connected to the system to control the pattern of connection of the charged capacitors to the load, thereby to place a predetermined and controllable voltage across the load.

33. An electric system as claimed in claim 18 in which the bistable circuit means comprises four field effect transistors connected to operate as first and second pairs, one transistor of each pair being conducting when the other is non-conducting to provide two conditions of bistable circuit operation, the input to first pair being derived in part from the output of the second pair and in part from said light sensitive means, the input to the second pair being derived from the output of the first pair, the output of the second pair constituting, also, an output from the bistable circuit means which is connected to control in part the switch means.

34. An electric system as claimed in claim 33 in which the light sensitive means are light-sensitive diodes which are part of a trigger circuit and in which the reference voltage means includes a zener diode, the light-sensitive diodes being serially connected as a voltage divider across the zener diode, the center voltage between the serially connected light-sensitive diodes being variable as a function of the relative states of electrical conduction of the light-sensitive diodes and being said center-referenced control voltage, the center-referenced voltage being connected as the other input to the first pair of field effect transistors.

35. An electric system as claimed in claim 34 which further includes means for selectively exposing the light-sensitive diodes to radiation as alternate conditions to cause one or the other of the light-sesitive diodes to conduct and thereby determine the value of said center voltage, the bistable circuit means output changing from one to the other of two stable signal levels whenever the center voltage passes through a magnitude equal to one-half the voltage across the zener diode.

36. An electric system as claimed in claim 35 in which the means for selectively exposing the light-sensitive diodes comprises a light-emitting diode associated with and radiatively coupled to the associated light-sensitive diode.

37. An electric system as claimed in claim 36 that further includes a program control connected to the light-emitting diodes adapted to determine which of the light-emitting diodes is energized thereby to control which of the two stable signal levels prevails as an output from the bistable circuit and, therefore, which side of the supply voltage means is connected to said terminal.

38. An electric system as claimed in claim 35 in which the means for selectively exposing the light-sensitive diodes to radiation comprises a light source and light-pipe means to radiatively couple the light source and the light-sensitive diodes.

39. In an electric system, a light-actuated bistable circuit comprising in combination, four field effect transistors connected to operate as first and second pairs to provide a circuit output which is at one or the other of two stable electric signal levels, the input to the first pair being derived in part from the output of the second pair and in part from light sensitive means which is adapted to provide a voltage output as a function of radiation impinged thereupon, the inputs to the second pair being derived from the output of the first pair, the circuit output being at said one or the other of the two stable levels as a function of the voltage signal derived from the light sensitive means.

40. An electic system as claimed in claim 39 in which the light sensitive means comprises two serially-connected light sensitive diodes and a zener diode connected across the light-sensitive diodes to provide a reference voltage, the light sensitive diodes acting as a voltage divider, said reference voltage being a center-referenced control voltage, the center-referenced control voltage being that appearing at the serial connection between the diodes and being variable as a function of the state of conduction of the light-sensitive diodes.

41. An electric system as claimed in claim 40 that further includes means for selectively exposing the light-sensitive diodes to radiation as alternate conditions to cause one or the other of the light sensitive diodes to conduct to determine the magnitude of said cente-referenced control voltage.

42. A system as claimed in claim 40 that comprises a plurality of stages having a plurality of light-actuated bistable circuits, one in each stage and adapted to control the associated stage to function at one or the other of two operatng states, and program control means operable to control exposure of the light-sensitive diodes.

43. An electric system that comprises a plurality of stages connected in cascade, each stage including, in combination, supply voltage means connected along two alternate paths to an electric terminal of the stage, switch means connected between the supply voltage means and the terminal and operable to determine which of the two paths is conductive thereby to determine which side of the supply voltage means is connected to the terminal, a light-actuated bistable circuit connected to control the switch means, one state of the bistable circuit acting to render conductive one of said paths and the other state of the bistable circuit acting to render conductive the other of said paths as alterate conditions of system operation.

44. An electric system as claimed in claim 43 which contains d-c input power means connected across the supply voltage means of the first stage of the system, said terminal of the first stage being connected as an input to the next stage, and so forth, the terminal of the last stage, of the cascade of stages consituting the output terminal of the system.

45. An electric system as claimed in claim 44 that further includes rectifier means connected between the terminal of the last stage and a storage capacitance.

46. An electric system as claimed in claim 45 in which the supply voltage means in each stage is a capacitor, the capacitors of the cascade of stages being connected in parallel to the d-c input power means for charging and a plurality of the capacitors being serially connected to charge the storage capacitance to a high voltage equal to the sum of the individual voltages across the serially connected capacitors and which includes a diode connected between adjacent stages to allow current to flow from the d-c input power means to the capacitors of the second and succeeding stages.

47. An electric system as claimed in claim 46 which includes a program control connected to direct actuation of the bistable circuit of each stage to determine the state of each circuit, the capacitors being connected in parallel for charging in one state of the bistable circuit and in series for discharging to the storage capacitance in the other state of the bistable circuit.

48. An electric system as claimed in claim 47 in which the bistable circuit comprises four field effect transistors connected to operate as first and second pairs, one transistor of each pair of an operating system being conducting when the other is non-conducting to provide two states of bistable circuit operation, the input to the first pair being derived in part from the output of the second pair and in part from light actuated trigger means, the input to the second pair being derived from the output of the first pair, the output of the second pair constituting, also, an output from the bistable circuit, which is connected to control the switch means.

49. An electric system as claimed in claim 48 in which the trigger means includes two serially connected light sensitive diodes and radiation means radiatively coupled to the diodes and which includes a zener diode connected across the light sensitive diodes which act as a voltage divider whose center voltage at the serial connection is connected as an input to said first pair.

50. An electric system as claimed in claim 49 in which the magnitude of said center voltage is variable as a function of the electrical conductivity of the light sensitive diodes, the conductivity being a function of radiation impinged upon the light-sensitive diodes, and in which a program control is connected to direct the radiation means, thereby to determine which of the two light sensitive diodes is exposed to radiation as alternate conditions of system operation, the bistable circuit being adapted to switch from one to the other of its two stable states whenever the center voltage passes through a value equal one half the value of the voltage across the zener diode, the capacitors being thus either connected in parallel across the d-c input power means for charging or a plurality of the capacitors being connected in series in a programmed time pattern to said capacitance storage as alternate conditions of system operation.

51. An electric system as claimed in claim 50 which further includes a load connected across the capacitor of the first stage and which also includes: a first switch connected between the d-c input power means to the system, a second switch connected across the rectifier means and operable selectively to by-pass said rectifier means, a third switch connected across each said diode, the first switch and the second switch and the third switch in combination with the other elements of the system acting to allow the capacitance storage to be charged to a predetermined high voltage by the cascade of stages and to be discharged to the load by the cascade of stages at a predetermined low voltage, all in response to control signals from the program control.

52. An electric system as claimed in claim 43 in which the supply voltage means is a capacitor in each stage and that includes a source of d-c voltage connected to the terminal of the last stage of the cascade of stages, said switch means being operable to connect the capacitors of the cascade of stages in series thereby to charge the same and being operable to connect two or more of the capacitors in parallel across a load, thereby to step the voltage of the source down to a voltage which is acceptable by the load.

53. An electric system as claimed in claim 52 that further includes a program control connected into the system to control the timing of the series and parallel connections of the capacitors and to determine the number of stages of the cascade of stages that is connected in parallel to said load, thereby to determine the electric current available to the load.

54. An electric system that comprises a plurality of N stages connected in cascade, each stage including energy storage means connected along two alternate conductive paths to an electric terminal of the stage, thence to the next succeeding stage and, eventually, to the electric terminal of the Nth stage, switch means connected in the system and operable to determine which of the two paths is conducting at a particular state of system operation, and bistable circuit means connected to control said switch means.

* * * * *